(12) United States Patent
Mansouri et al.

(10) Patent No.: US 11,884,015 B2
(45) Date of Patent: Jan. 30, 2024

(54) SYSTEM AND METHOD FOR FACILITATING SEPARATION OF STEREOLITHOGRAPHY 3D-PRINTED OBJECTS FROM BUILD PLATFORMS

(71) Applicant: SprintRay Inc., Los Angeles, CA (US)

(72) Inventors: Amir Mansouri, Los Angeles, CA (US); Aayush Patel, Los Angeles, CA (US); Angali E. Daniels, Los Angeles, CA (US); Huijian Tian, Los Angeles, CA (US); Chonghuan Huang, Los Angeles, CA (US)

(73) Assignee: SprintRay, Inc., Los Angeles, CA (US)

( * ) Notice: Subject to any disclaimer, the term of this patent is extended or adjusted under 35 U.S.C. 154(b) by 0 days.

(21) Appl. No.: 17/589,804

(22) Filed: Jan. 31, 2022

(65) Prior Publication Data
US 2022/0242041 A1  Aug. 4, 2022

Related U.S. Application Data

(60) Provisional application No. 63/296,593, filed on Jan. 5, 2022, provisional application No. 63/143,122, filed on Jan. 29, 2021.

(51) Int. Cl.
*B29C 64/245* (2017.01)
*B33Y 30/00* (2015.01)
*B29C 64/124* (2017.01)

(52) U.S. Cl.
CPC .......... *B29C 64/245* (2017.08); *B29C 64/124* (2017.08); *B33Y 30/00* (2014.12)

(58) Field of Classification Search
CPC ... B29C 64/245; B29C 64/124; B29C 64/129; B29C 64/135; B33Y 30/00
See application file for complete search history.

(56) References Cited

U.S. PATENT DOCUMENTS

| | | | |
|---|---|---|---|
| 8,556,527 B1 * | 10/2013 | Chou | A45D 40/04 401/98 |
| 2016/0082670 A1 * | 3/2016 | Paroda | B29C 64/40 425/375 |
| 2016/0271873 A1 * | 9/2016 | Albert | B29C 64/209 |

\* cited by examiner

*Primary Examiner* — Joseph S Del Sole
*Assistant Examiner* — Jamel M Nelson
(74) *Attorney, Agent, or Firm* — JAFARI LAW GROUP, INC.

(57) ABSTRACT

A system and method for facilitating separation of 3D-printed objects from build platforms. The principle of separation in the present invention involves a build platform configured to be removable or flexible or partially deformable, such that at least a portion of the build platform may be bent or tilted to separate the build platform from the 3D-printed object once the 3D-printing is completed. In some embodiments, a base assembly is adapted to magnetically move a build plate along a surface of the base assembly such that the build plate automatically self-aligns along a boundary of the base assembly and magnetically couples to the base assembly. In some embodiments, a build platform includes a flexible layer with a printable surface and a rigid layer coupled to the flexible layer so that applying a force on the flexible layer deforms a localized portion of the printable surface without deforming the rigid layer.

19 Claims, 19 Drawing Sheets

FIG. 1
(PRIOR ART)
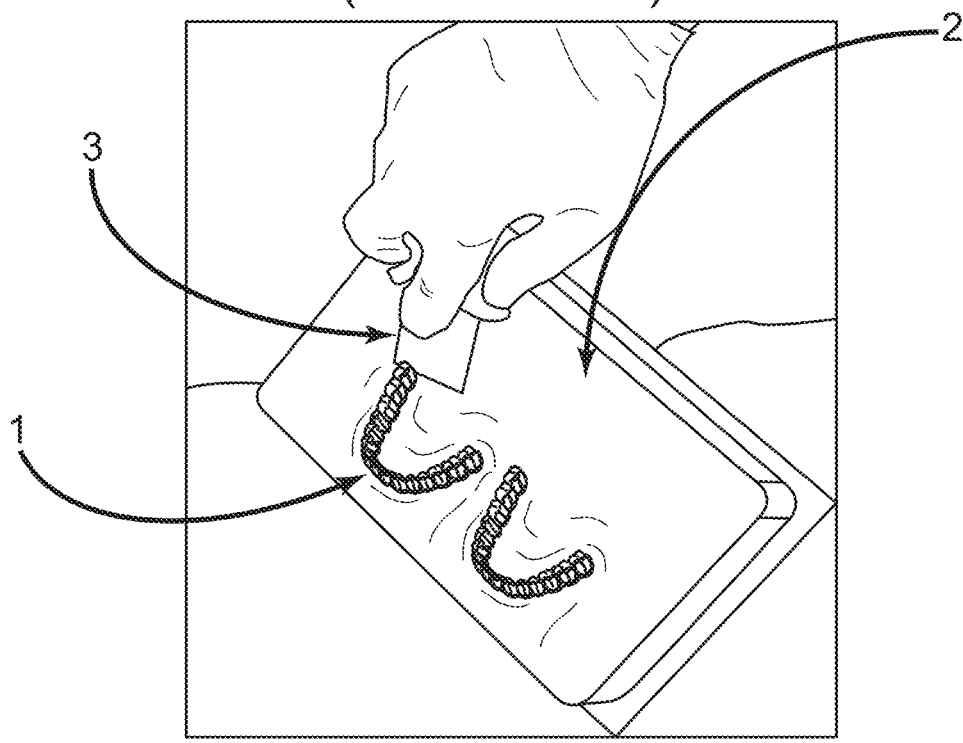
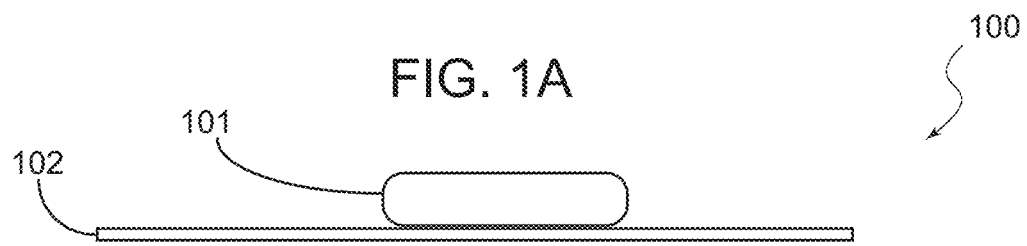
FIG. 1A
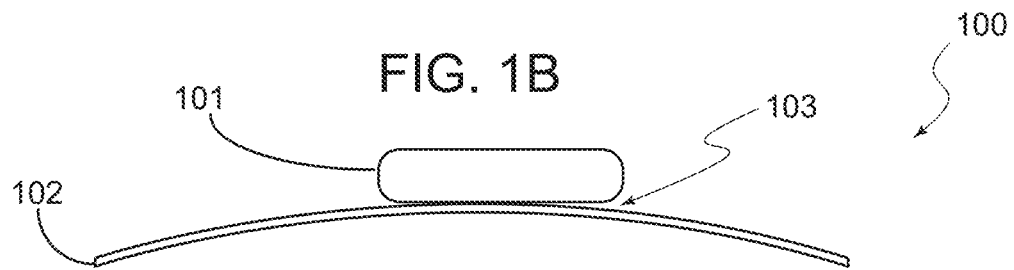
FIG. 1B

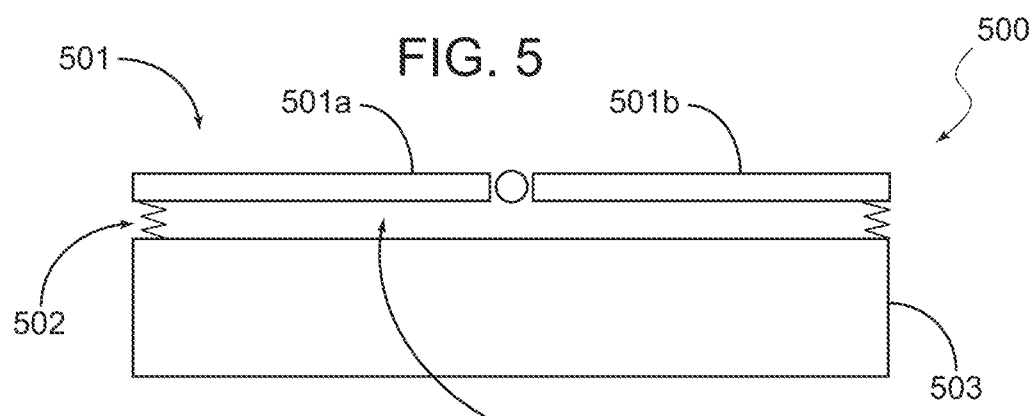
FIG. 5
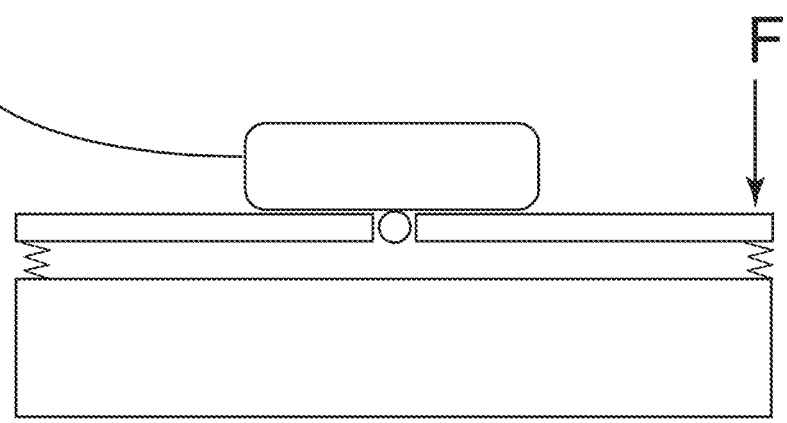
FIG. 5A
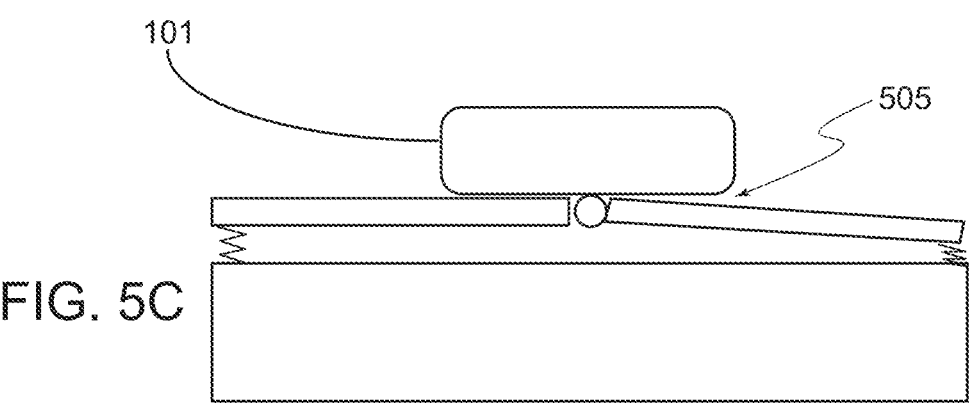
FIG. 5B
FIG. 5C

FIG. 6
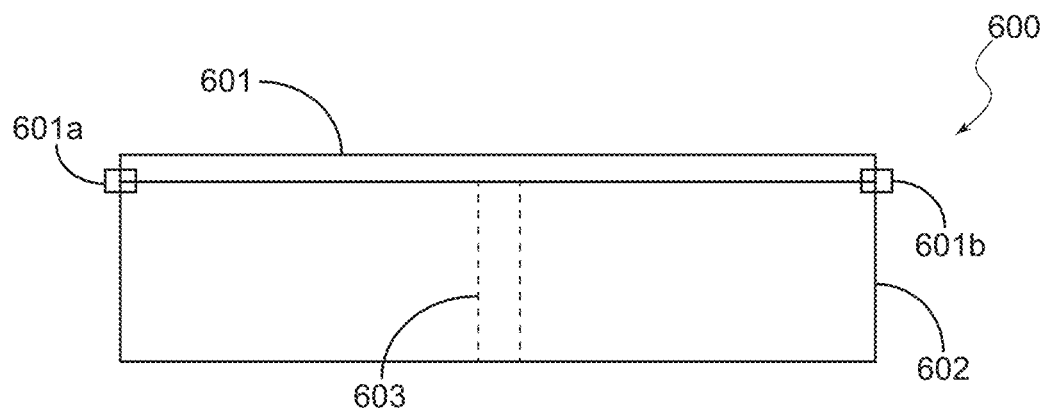
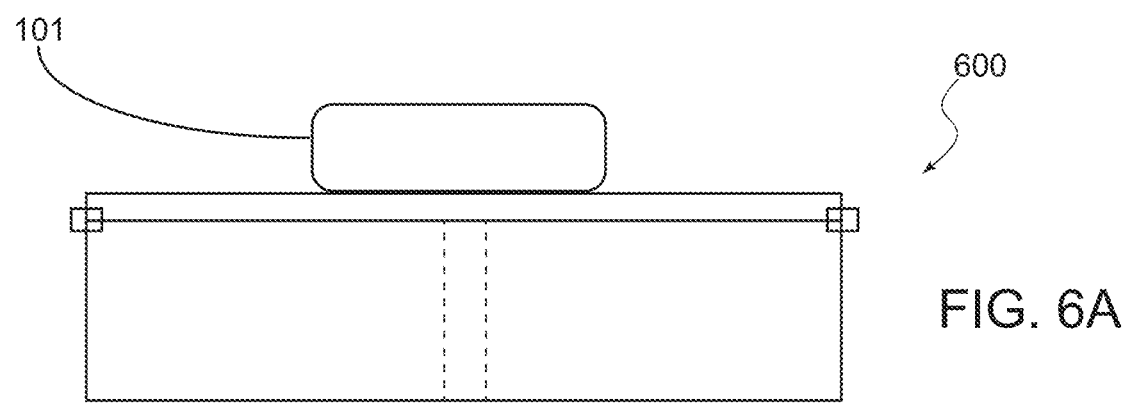
FIG. 6A
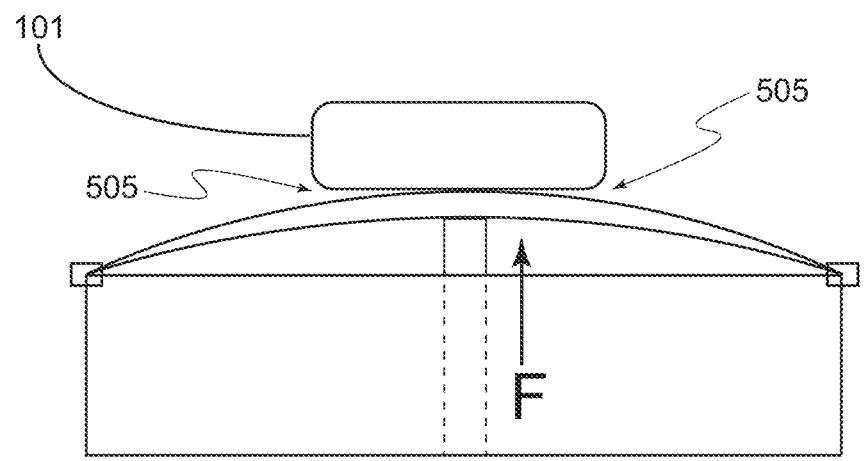
FIG. 6B

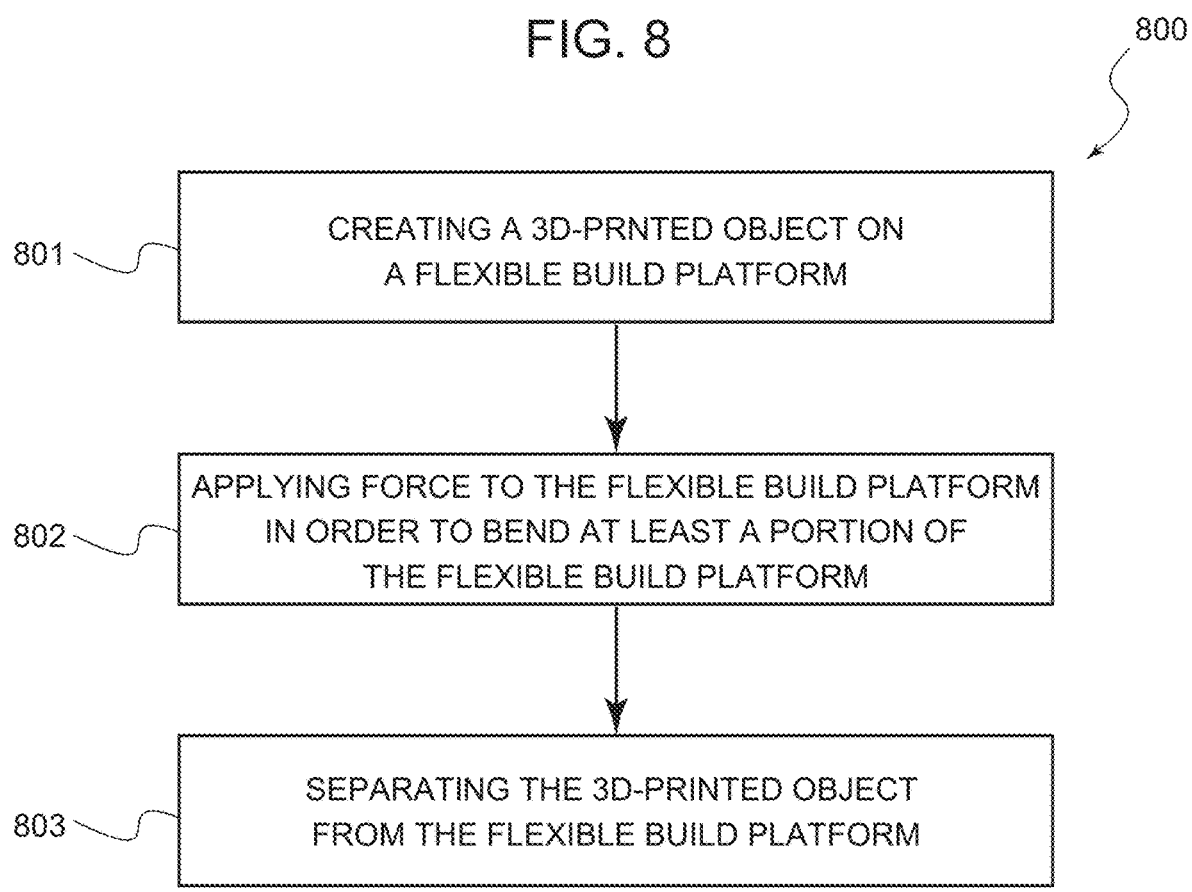

Sanded Carbon Fiber Build Plate vs. Carbon Fiber with Machined grooves for Texture Smooth vs. Sanded Spring Steel with Aluminum Platform

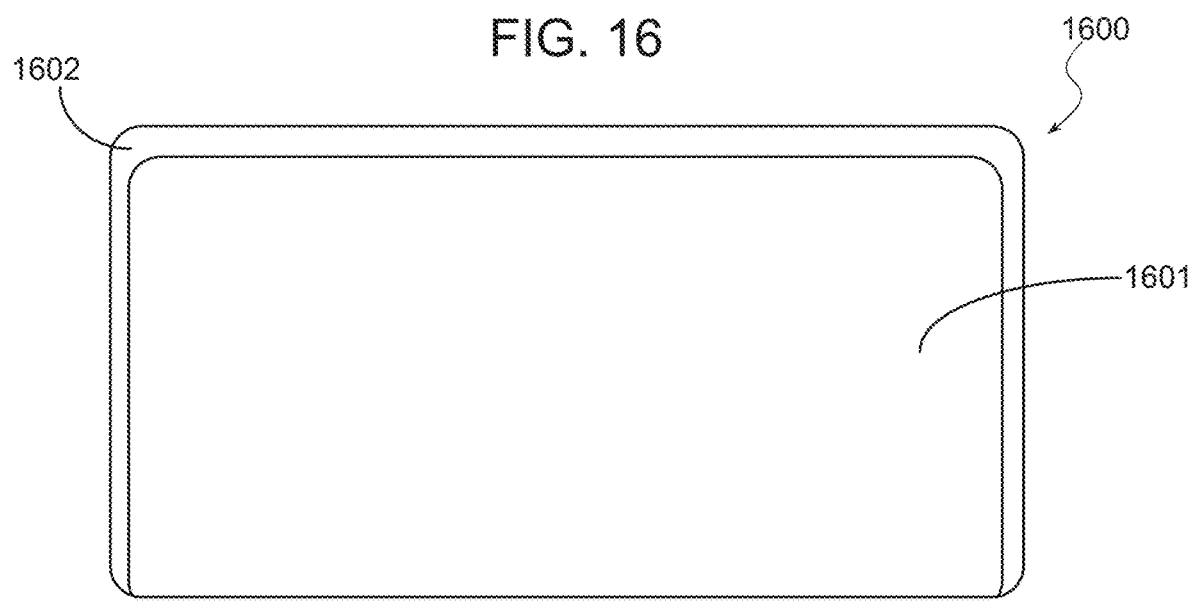

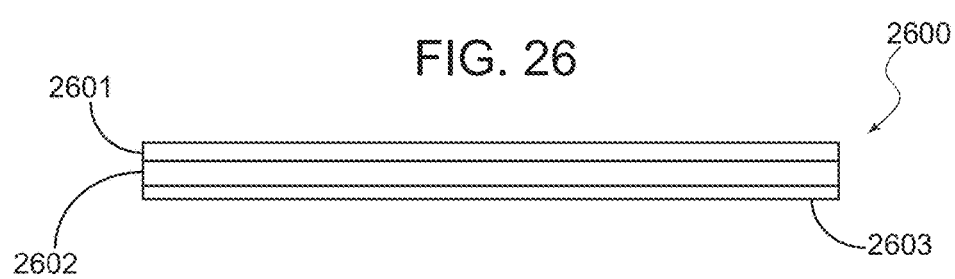
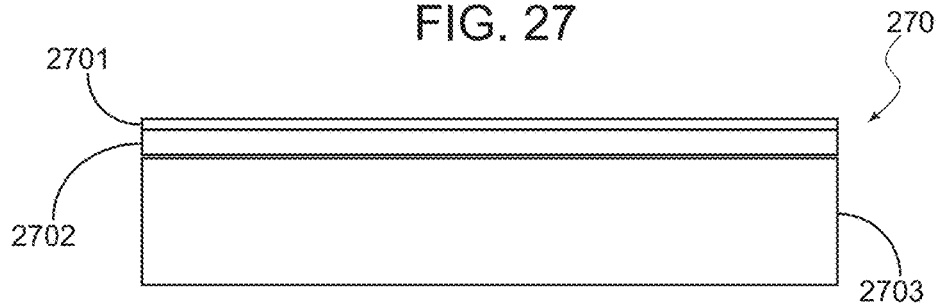
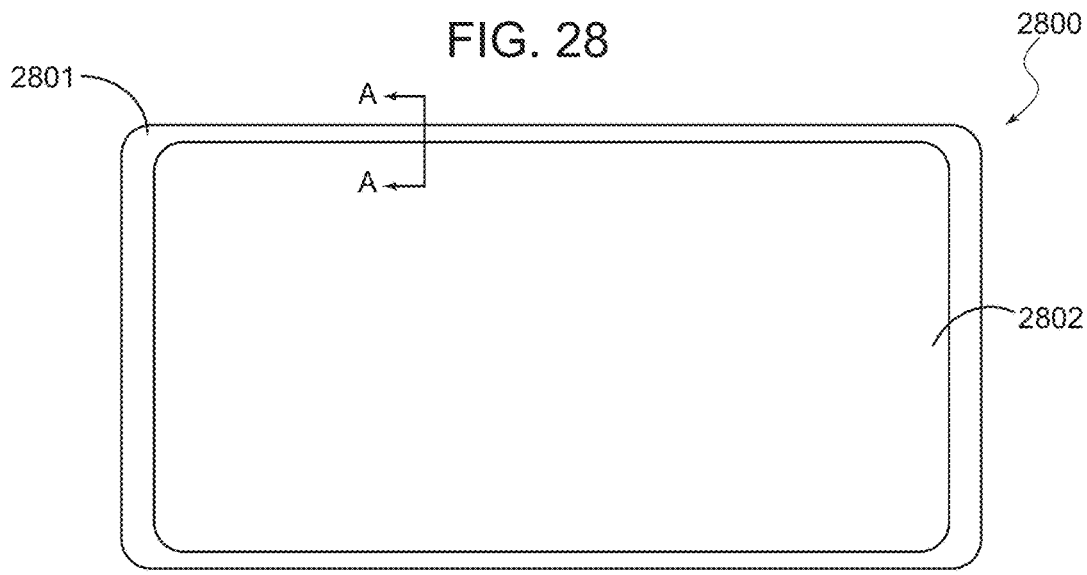
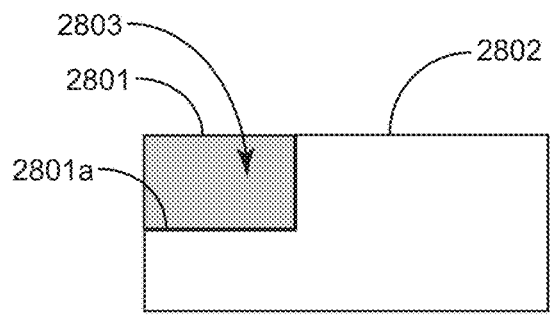
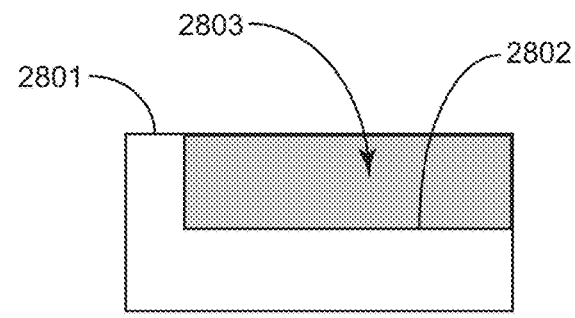

SYSTEM AND METHOD FOR FACILITATING SEPARATION OF STEREOLITHOGRAPHY 3D-PRINTED OBJECTS FROM BUILD PLATFORMS

PRIOR RELATED APPLICATIONS

This application claims priority under 35 USC § 119 to U.S. Provisional Application No. 63/296,593, filed on Jan. 5, 2022, and to U.S. Provisional Application No. 63/143,122, filed on Jan. 29, 2021, the disclosures of which are incorporated by reference in their entirety.

TECHNICAL FIELD OF THE INVENTION

The present invention relates generally to three-dimensional (3D) printing of objects. More specifically, the present invention relates to a system and method for facilitating separation of stereolithography 3D-printed objects from build platforms.

COPYRIGHT AND TRADEMARK NOTICE

A region of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Typically, 3D-printed parts or objects are created using 3D-printing techniques comprising printing or otherwise building each 3D-printed object on a platform of the 3D printing device. This platform is often referred to as a printing platform or build platform. Because the 3D-printed object is created on the build platform, the 3D-printed object is initially stuck onto at least a portion of the build platform since portions of the build material of the 3D-printed object are solidified onto the build platform itself. Naturally, in order to complete and ultimately make use of the 3D-printed object, the 3D-printed object must be separated from the build platform.

Often, the 3D-printed object is stuck hard enough to the build platform that separation from the build platform requires using a sharp tool such as a knife or a blade to separate the 3D-printed object from the build platform. This method is cumbersome, inefficient, and creates problems.

For example, the time required to manually remove each 3D-printed object becomes increasingly inefficient, especially when large quantities of a 3D-printed objects may be involved, since manual labor will be required for each part. Similarly, manually separating each object with known techniques and tools (such as knifes, scrapers, and the like) expose the individual manually separating the parts to potential injury—often, individuals may cut and or accidently stab their hands with the tools that are used to separate the 3D-printed objects.

Accordingly, separating 3D-printed objects using traditional stereolithography 3D printing techniques requires a lot of effort and is especially inefficient when 3D-printing high-volume orders is required.

Therefore, there is a need for a system and method that addresses these shortcomings, and it is to these ends that the present invention has been developed.

BRIEF SUMMARY OF THE INVENTION

According to the present invention, a system and method is described for facilitating separation of 3D-printed objects from build platforms. The principle of separation in the present invention involves a build platform configured to be flexible or partially flexible, such that at least a portion of the build platform may be bent or tilted to separate the build platform from the 3D-printed object once the 3D-printing is completed. Moreover, the present invention introduces a build platform that facilitates removal of 3D-printed parts or objects from the build platform without the need of manual labor or without necessitating extrinsic tools such as a scrapping tool.

Some aspects of the invention involve a build platform for a stereolithographic printer that includes an alignment module. The build platform may comprise a removable build plate having a build surface for building three-dimensionally (3D)-printed objects on the build platform; a base assembly removably coupled to the removable build plate; and a magnetic alignment module adapted to magnetically move the removable build plate along a surface of the base assembly such that the removable build plate automatically self-aligns along a boundary of the base assembly and magnetically couples to the base assembly.

In some embodiments, the build platform with an alignment module may comprise: a removable build plate having a flexible build surface for building three-dimensionally (3D)-printed objects on the build platform; a base assembly removably coupled to the removable build plate; and a magnetic alignment module, comprising: a first configuration of magnets disposed on a surface of the removable build plate such that a first set of magnets are distributed along a perimetrical edge of the surface, and a second set of the magnets are distributed in two clusters along a center region of the surface; and a second configuration of magnets disposed on a surface of the base assembly that correspond to but have opposite polarity to each of the first configuration of magnets disposed on the surface of the removable build plate; wherein the magnetic alignment module is adapted to magnetically move the removable build plate along a top surface of the base assembly such that the removable build plate automatically self-aligns along a boundary of the base assembly and magnetically couples to the top surface of the base assembly.

Some aspects of the invention involve a build platform for a stereolithographic printer that includes a printable surface that is deformable. The building platform may comprise: a flexible layer having a printable surface for building three-dimensionally (3D)-printed objects on the printable surface of the flexible layer; and a rigid layer coupled to the flexible layer so that applying a force on the flexible layer deforms a localized portion of the printable surface without deforming the rigid layer.

In some embodiments, the build platform with a deformable printing layer may comprise: a flexible layer having a printable surface for building three-dimensionally (3D)-printed objects on the printable surface of the flexible layer; a rigid layer coupled to the flexible layer; and a middle layer sandwiched between the flexible layer and the rigid layer, wherein the flexible layer, the middle layer, and the rigid layer are adapted so that applying a force on the flexible layer deforms a localized portion of the printable surface without deforming the rigid layer.

In some embodiments, the build platform with a deformable printing layer may comprise: a flexible layer having a carbon fiber layer for a printable surface for building three-dimensionally (3D)-printed objects on the printable surface of the flexible layer; a rigid layer comprising an aluminum or steel block coupled to the flexible layer; and a middle layer sandwiched between the flexible layer and the rigid layer, wherein the flexible layer, the middle layer, and the rigid layer are adapted so that applying a force applied on the flexible layer deforms a localized portion of the printable surface without deforming the rigid layer.

Some aspects of the invention include a building platform for a 3D printer. The building platform my include a removable build plate having a flexible printing surface for printing three-dimensionally (3D)-printed objects on the build platform; and a base assembly removably coupled to the removable build plate.

The base assembly may be configured in various ways in accordance with the present invention. For example, the base assembly may be adapted to apply a force on the removable build plate that bends at least a portion of the flexible printing surface. The base assembly may be adapted to alter a stiffness of the removable build plate through an electrical input or a mechanical input. The base assembly may be mechanically or magnetically removably coupled to the removable build plate. The base assembly may include an actuator adapted to mechanically release the removable build plate from the base assembly. The base assembly may employ a suction module adapted to apply a negative force on the removable build plate to secure the removable build plate to the base assembly. In some embodiments, a sensor may be coupled to the base assembly and adapted to detect whether the removable build plate is coupled on the base assembly.

In some exemplary embodiments, a building platform may include a removable build plate having a flexible printing surface for printing three-dimensionally (3D)-printed objects on the build platform; a base assembly removably coupled to the removable build plate; and a magnetic module adapted to magnetically couple and align the removable build plate on a surface of the base assembly. In some embodiments, the magnetic module is adapted to align the removable build plate on the surface of the base assembly. In some embodiments, the base assembly includes a raised edge adapted to register with and align the removable build plate on a surface of the base assembly.

In some embodiments, the build platform may further comprise a sealing surface on the base assembly or the removable build plate that creates a seal between the removable build plate and the base assembly. In some embodiments, the build platform further comprises a sealing surface covering an edge of the removable build plate that creates a seal between the removable build plate and the base assembly.

In some embodiments, to facilitate manual operation, the removable build plate may include a tab extending from the flexible surface to facilitate manual placement or removal of the removable build plate on the base assembly, or optionally, or alternatively, or in addition to the tab on the build plate, the base assembly may include a recessed edge along a side surface of the base assembly to facilitate manual placement or removal of the removable build plate.

In some exemplary embodiments, a building platform may include a removable build plate having a flexible printing surface for printing 3D-printed objects on the build platform; a base assembly removably coupled to the removable build plate; and a separation module adapted to apply a force on the removable build plate that bends at least a portion of the flexible printing surface to separate a 3D-printed object built on the flexible printing surface of the removable build plate.

In some embodiments, the separation module comprises of an actuator adapted to bend the flexible printing surface of the removable build plate. In some embodiments, the actuator is adapted to press on the flexible printing surface from beneath or above the flexible printing surface. In other exemplary embodiments, the actuator is adapted to press on a side of the flexible printing surface. The separation module may comprise of at least one spring element coupled between the base assembly and the flexible printing surface of the removable build plate. In some exemplary embodiments, the separation module is housed entirely within the base assembly.

In some exemplary embodiments, the invention includes a build platform for a 3D printer, which facilitates separation of 3D-printed objects created on the build platform. The build platform may be at least partially flexible and may include: a flexible layer providing a top surface of the build platform; and a rigid layer situated below and coupled to the flexible layer so that applying a force on the flexible layer bends at least a portion of the flexible layer without bending the rigid layer.

In some exemplary embodiments, the invention includes a system. The system may include a 3D printer configured to facilitate separation of 3D-printed objects from a build platform of the printer. The printer may include: a reservoir tank for storing a forming material; a lifting platform perpendicular to a bottom surface of the reservoir tank; and a build platform coupled to the lifting platform, the build platform, comprising: a flexible layer providing a top surface of the build platform; and a rigid layer situated below and coupled to the flexible layer so that applying a force on the flexible layer bends at least a portion of the flexible layer without bending the rigid layer.

In some exemplary embodiments, the invention includes a method for separation of 3D-printed objects from a build platform. The method may include: (1) creating a 3D-printed object on a flexible build platform; (2) applying a force to a portion of the flexible build platform to bend at least a portion of the flexible build platform; and (3) separating the 3D-printed object from the flexible build platform.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF DRAWINGS

Elements in the figures have not necessarily been drawn to scale in order to enhance their clarity and improve understanding of these various elements and embodiments of the present invention. Furthermore, elements that are known to be common and well understood to those in the industry are not depicted in order to provide a clear view of the various embodiments of the invention.

FIG. 1 is an image of a 3D-printed objected being separated from a prior art build platform using a conventional tool.

FIG. 1A-FIG. 1B depict a system and method in accordance with some exemplary embodiments of the present invention.

FIG. 5 illustrates a build platform in accordance with some exemplary embodiments of the present invention.

FIG. 5A-FIG. 5C illustrate a method that may be performed by build platform 500 in accordance with the present invention.

FIG. 6 illustrates a build platform in accordance with some exemplary embodiments of the present invention.

FIG. 6A-FIG. 6B illustrate a method that may be performed by build platform 600 in accordance with the present invention.

FIG. 8 illustrates a flow chart of a method in accordance with some exemplary embodiments of the present invention.

FIG. 16 illustrates a top view of a base assembly for a build platform in accordance with some exemplary embodiments of the present invention.

FIG. 26 illustrates a build plate for a build platform to which a seal has been applied, in accordance with some exemplary embodiments of the present invention.

FIG. 27 illustrates a base assembly for a build platform to which a seal has been applied, in accordance with some exemplary embodiments of the present invention.

FIG. 28 illustrates a build plate for a build platform to which a seal has been applied along an edge of the build platform, in accordance with some exemplary embodiments of the present invention.

FIG. 28A-FIG. 28B illustrate a build plate for a build platform to which a seal has been applied along an edge of the build platform, in accordance with some exemplary embodiments of the present invention.

DESCRIPTION OF THE INVENTION

Figure 2:
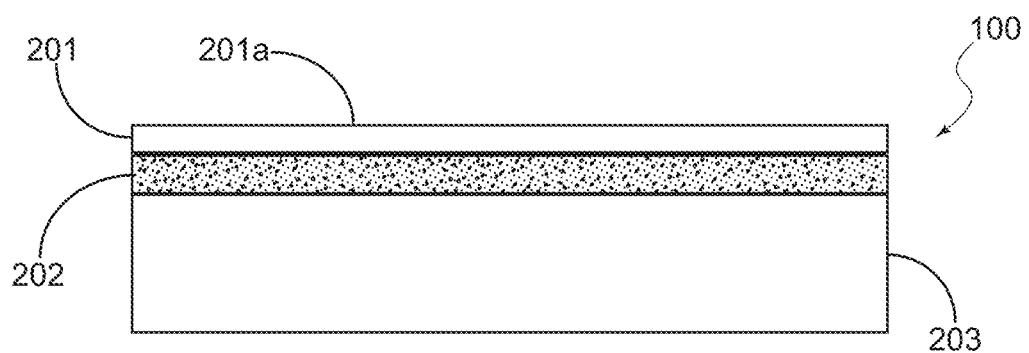
FIG. 2 illustrates a system in accordance with some exemplary embodiments of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

As used in this disclosure, the term "comprise" and variations of the term, such as "comprising" and "comprises", are not intended to exclude other additives, components, integers or steps. For purpose of description herein, the terms "upper", "lower", "left", "right", "front", "rear", "horizontal", "vertical" and derivatives thereof shall relate to the invention as oriented in figures. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristic relating to the embodiments disclosed herein are not to be considered as limiting, unless the claims expressly state otherwise.

Turning now to the figures, FIG. 1 is an image of a 3D-printed objected 1 being separated from a prior art build platform 2 using a conventional tool 3, which typically include sharp-edged scrapers or the like. As may be gleaned from this view, this prior art method of separating 3D-printed parts or objects from a prior art build platform is cumbersome, must be performed necessarily by hand or manually, and creates the issues that the present invention is designed to avoid.

Turning to the next set of figures, FIG. 1A-FIG. 1B illustrate a basic system and method in accordance with some exemplary embodiments of the present invention. From these views, system 100 is shown with a 3D-printed object 101 that has been printed or built onto a build platform that includes a build plate 102 in accordance with the present invention. As may be gleaned from FIG. 1A, and especially the subsequent FIG. 1B, at least a portion of the build platform 102 is flexible. For example, and without limiting the scope of the present invention, a top surface of the build platform, such as a build plate 102 that is in contact with or onto which the 3D-printed object is printed on, is flexible or bendable. This flexibility allows at least a portion of the build platform 102 to bend in a manner such that a bottom surface of the 3D-printed object and a top surface of the build platform are separated or create a separation 103. In this way, any forming material coupling the 3D-printed object to the surface of the build platform is decoupled from the build platform and thus the 3D-printed object separated from the build platform.

Rather than using a build platform that is completely rigid, for example using blocks of aluminum or very rigid inflexible plates of steel or ceramic that makes them impossible to bend, a flexible build plate 201 may be manufactured using multiple layers including less rigid materials. However, the flexibility element must be managed because too much flexibility in the build platform may introduce accuracy issues during the printing process. Accordingly, the present invention introduces a method of creating a build platform that offers both, rigidity during 3D printing, and flexibility during the separation process.

Figure 3:
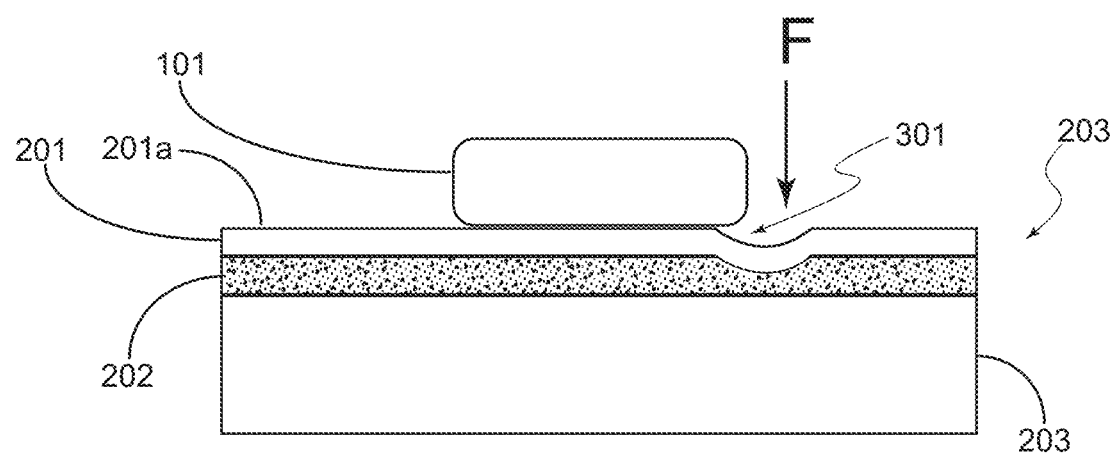
FIG. 3 illustrate a method that may be performed with build platform 200 in accordance with the present invention.

Turning now to the next figure, FIG. 2-FIG. 3 illustrate a system and method in accordance with some exemplary embodiments of the present invention. More specifically, FIG. 2-FIG. 3 depict build platform 200, which is formed by a sandwiched multi-layer structure that is configured for creating localized tilting/movement/peeling/deformation underneath the 3D-printed objects. Build platform 200 may be at least partially flexible and may include: a flexible layer 201 providing a top surface of the build platform; and a rigid layer 203 situated below and coupled to the flexible layer so that applying a force on the flexible layer bends at least a portion of the flexible layer without bending the rigid layer. Moreover, in this embodiment, a middle layer 202 may comprise of a thin flexible material such as silicon, foam, or velcro. The top layer 201 may be a sheet of a rigid material which has some flexibility such as carbon fiber sheets.

Accordingly, in some exemplary embodiments, a build platform 200 for a stereolithographic printer, may include a flexible layer 201 having a printable surface 201a for building 3D-printed objects on the printable surface 201a of the flexible layer 201. Moreover, to ensure stability during printing and to structurally support flexible layer 201, build platform 200 may include a rigid layer 203 coupled to the flexible layer so that applying a force on the flexible layer deforms a localized portion of the printable surface without deforming the rigid layer. In some exemplary embodiments, flexible layer 201 comprises a carbon fiber layer that serves as the printable surface 201a of the flexible layer 201.

The rigid layer 203 may comprise aluminum or steel, or both, and is typically a sturdy layer that provides stability and support for the forces necessary for building the 3D-printed objects on the printable surface 201a of the flexible layer 201. As shown in FIG. 2 and FIG. 3, build platform 200 may further include a middle layer 202 that is sandwiched between the flexible layer and rigid layer. In some exemplary embodiments, the middle layer 202 comprises a silicon layer. In some exemplary embodiments, the middle layer 202 comprises a foam layer. In some exemplary embodiments, the middle layer 202 comprises a Velcro layer.

After the 3D printing process is completed, the area underneath the 3D-printed object is pressed down and the part comes off very easily. As shown in the following figure, FIG. 3 illustrates this method that may be performed by a system employing build platform 200 in accordance with the present invention. Method 300 creates a local peeling of the build plate that is enough to initiate a propagation of the gap 301 between the 3D-printed object and build platform 200, resulting in separating the 3D-printed object completely. This avoids having to use tools that can damage the 3D-printed part or hurt the user handling the manual separation.

Figure 4:
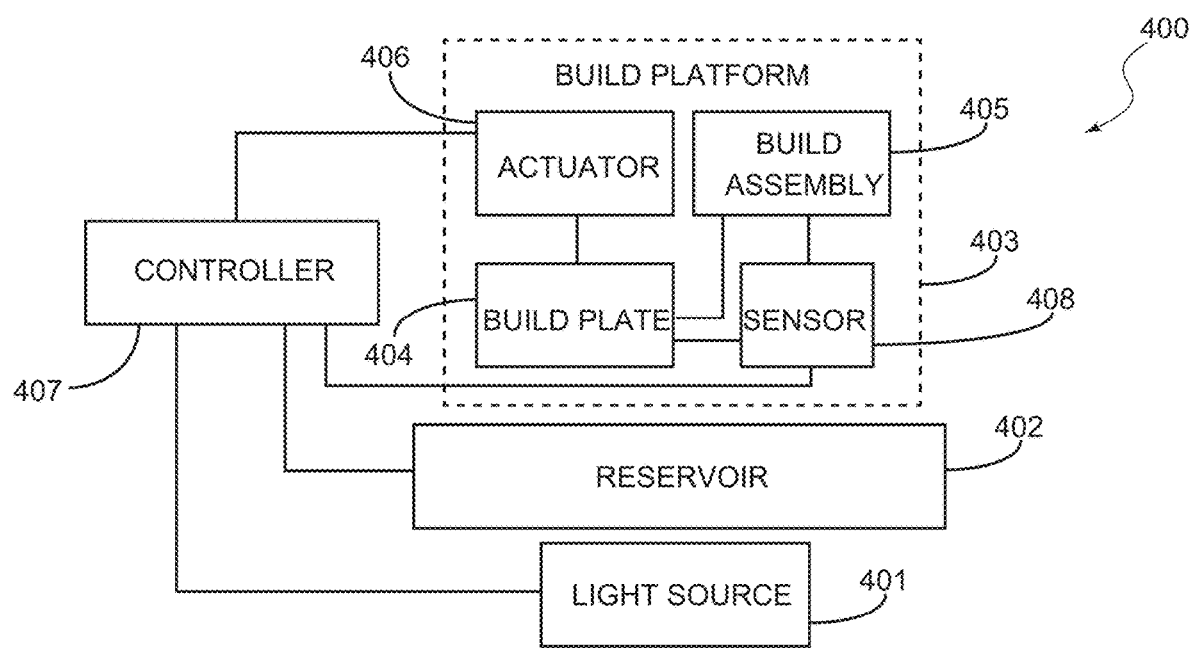
FIG. 4 is a block diagram of a system in accordance with some exemplary embodiments of the present invention.

Turning now to the next set of figures, FIG. 4 illustrates build platform in accordance with some exemplary embodiments of the present invention. More specifically FIG. 4 illustrates a block diagram of a stereolithographic printer 400. In this exemplary embodiment, a 3D printer—for example a stereolithographic printer—is configured to facilitate separation of the 3D-printed objects from a build platform.

Figure 4A:
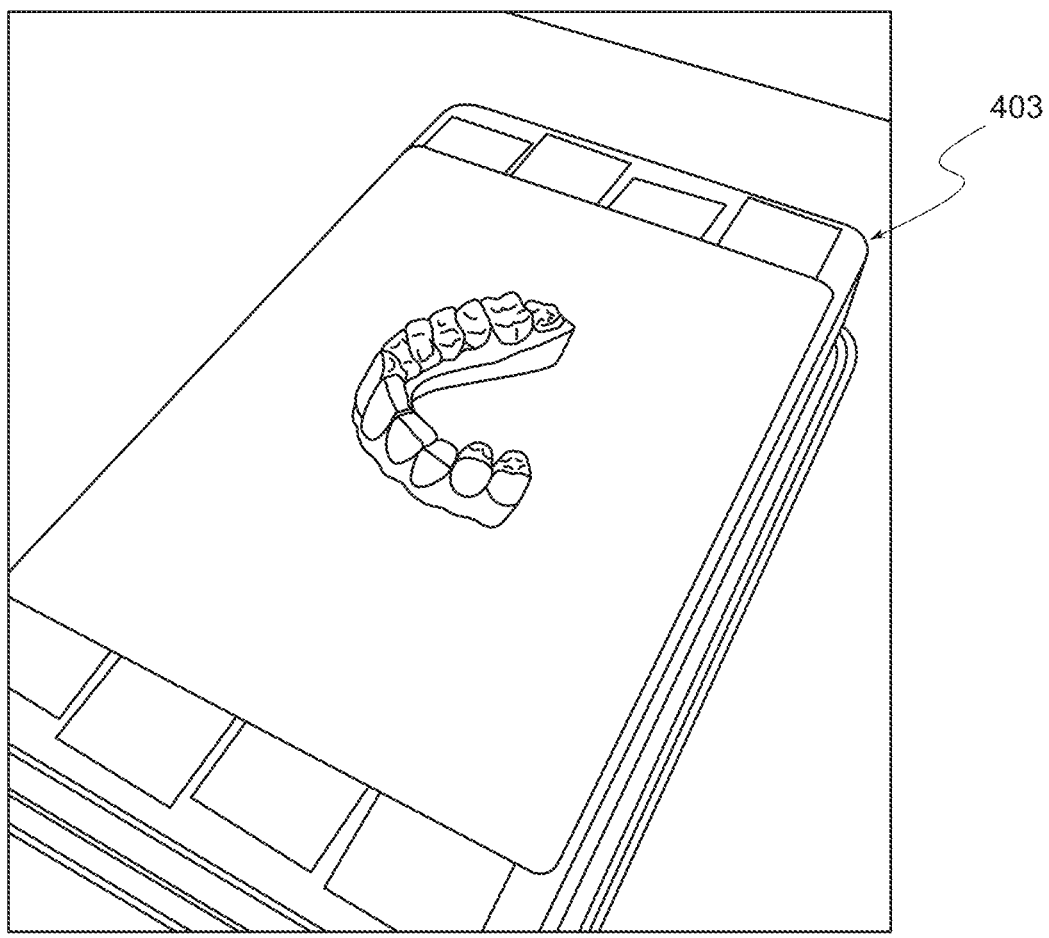
FIG. 4A is an image of build platform in accordance with some exemplary embodiments of the present invention.

Printer 400 may include a light source 401, reservoir tank 402 for storing a forming material, and a build platform 403. The build platform 403 in accordance with the present invention, may comprise of: a flexible build plate 404 for providing a top surface of the build platform on which 3D-printed objects are built; and a build assembly 405 situated below and coupled to the build plate 404 to provide structural stability and so that applying a force on the build plate 404 bends at least a portion of the flexible build plate 404 without bending the build assembly 405; an actuator 406 coupled to the build platform 403; and a controller 407 in communication with the actuator 406, the controller 407 configured to activate the actuator 406 and apply a force on the flexible build plate 404 to bend at least a portion of the build plate 404 so as to create a gap adapted to separate a 3D-printed object created on the build platform. In exemplary embodiments, a sensor 408 may be coupled to the base assembly 405 and adapted to detect whether the removable build plate 404 is coupled on the base assembly 405. FIG. 4A is an image of a build platform in accordance with some exemplary embodiments of the present invention.

In some exemplary embodiments, instead of actuator 406, other means of bending or changing a stiffness or rigidity of the build plate may be employed. For example, and without limiting the scope of the present invention, instead of actuator 406, system 400 may employ a vibration module that includes a vibration motor coupled to build plate 404 of build platform 403 such that when activated by controller 407, the vibration motor will cause build plate 404 to vibrate cause a 3D-printed object to detach therefrom due to vibration.

Similarly, in another embodiment, instead of actuator 406, a module set to apply an electric charge to build plate 404 may be employed. In such embodiment, build plate 404 may include a piezoelectric material that changes its rigidity or stiffness when the electric charge is applied to it. In this way, for example and without limiting the scope of the present invention, instead of actuator 406, system 400 may employ a module configured to send an electric charge to build plate 404 of build platform 403 such that when activated by controller 407, the module will send the electric charge to the build plate and cause build plate 404 to change its rigidity causing a 3D-printed object to detach therefrom due to the change in stiffness or rigidity of the build plate.

FIG. 5 illustrates build platform in accordance with some exemplary embodiments of the present invention. More specifically, FIG. 5 depicts build platform 500, which utilizes similar principles by employing a mechanism to tilt/move/peel the build platform underneath the 3D-printed object in order to facilitate separation of the 3D-printed object from the build platform. In this exemplary embodiment, build platform 500 comprises of a flexible layer 501 providing a top surface of the build platform; a rigid layer 503 situated below and coupled to the flexible layer 501 so that applying a force on the flexible layer 501 bends at least a portion of the flexible layer 501 without bending the rigid layer 503. Moreover, in this embodiment, a middle layer 502a may comprise of a special separation between the flexible layer and the rigid layer. The separation may be facilitated by way of spring elements 502 that couple the flexible layer 501 to the rigid layer 503 and create the special separation 502a between the two layers. In exemplary embodiments, the flexible layer may be bendable by means of separating the flexible layer into two components 501a and 501b, that ware coupled together with a hinge mechanism or a means that allows the two components 501a and 501b to pivot about an axis. In this way, the flexible layer on the top may be split into two sections by application of a force, thereby bending the top surface of the build platform. Because on spring elements 502 are situated at terminal ends of the build platform 500, pressing down on the build platform will tilt or bend a portion of the build platform to create a gap 505 that propagates and separates the 3D-printed object. FIG. 5A-FIG. 5C illustrate a method that may be performed by system 500 in accordance with the present invention. As may be gleaned from these views, a force F applied on either spring element causes the bend or split in the top surface of the build plate.

FIG. 6 illustrates build platform in accordance with some exemplary embodiments of the present invention. FIG. 6A-FIG. 6B illustrate a method that may be performed by system 600 in accordance with the present invention. More specifically, build platform 600 is shown comprising a flexible layer 601, coupled to a rigid layer 602 by way of securing components 601a and 601b. Furthermore, an actuator 603 may be situated below the flexible layer 601 in order to bend at least a portion of the flexible layer and create a gap adapted to separate a 3D-printed object created on the build platform 600.

This embodiment employs an actuator to bend the flexible layer upward in order to separate the 3D-printed object as shown in FIG. 6A-FIG. 6B. The force is applied on the underside side of the flexible layer using a button or a spring-loaded system and when the user wants to separate the parts, the button may be pressed, the flexible layer may bend, and the 3D-printed object separates. The flexible layer may be coupled to terminal ends of the build platform to have the ability to fully bend.

Figure 7:
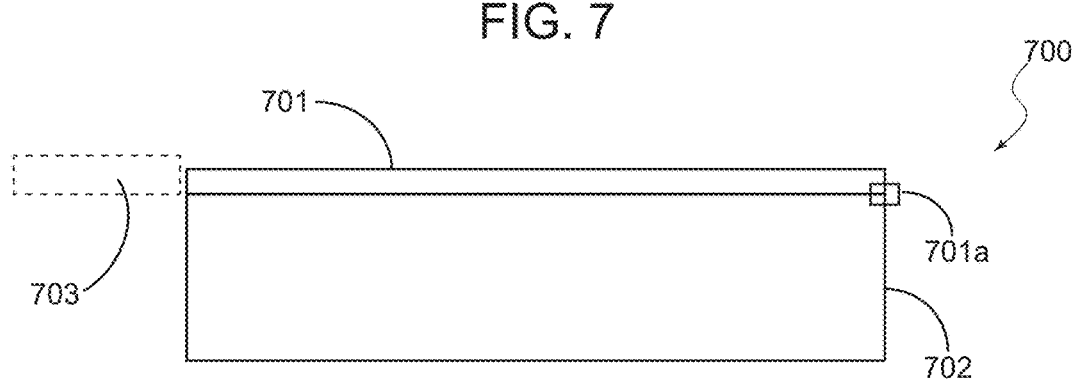
FIG. 7 illustrates a build platform in accordance with some exemplary embodiments of the present invention.
Figure 7A:
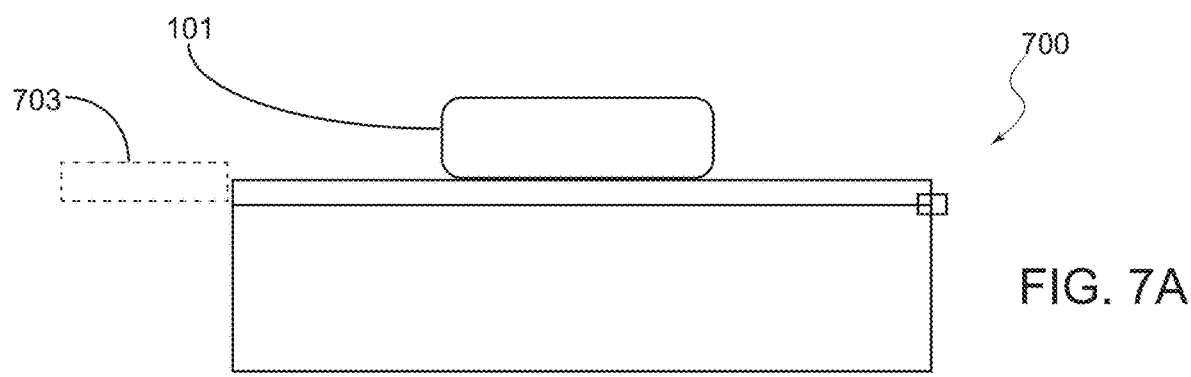
FIG. 7A-FIG. 7B illustrate a method that may be performed by build platform 700 in accordance with the present invention.
Figure 7B:
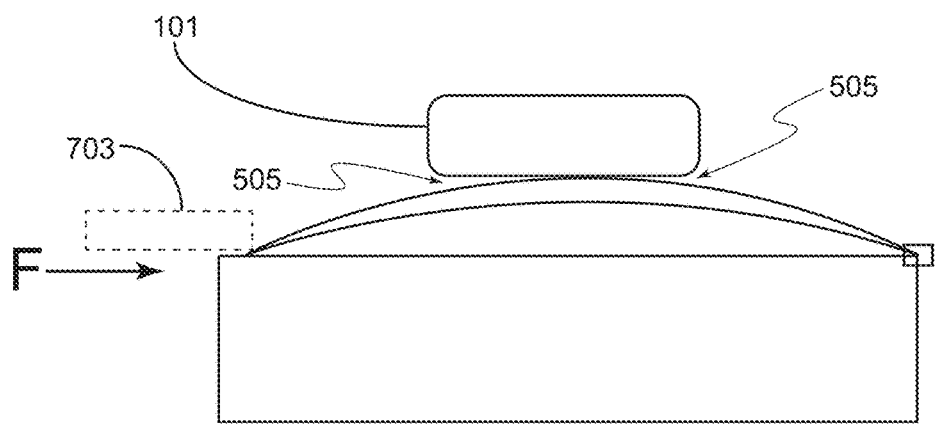

FIG. 7 illustrates build platform in accordance with some exemplary embodiments of the present invention. FIG. 7A-FIG. 7B illustrate a method that may be performed by system 700 in accordance with the present invention. In this embodiment, the force is applied from the side to make the flexible layer bend and separate the 3D-printed object. The flexible layer may be preferably restricted or coupled to one side only and should have the ability to move sideways. More specifically, build platform 700 is shown comprising a flexible layer 701, coupled to a rigid layer 702 by way of at least one securing component 701a situated at one terminal end of the build platform 701. Furthermore, an actuator 703 may be situated so that a force enacted by activating the actuator 703 is applied on one of the sides, typically opposite of the side secured by securing component 701a. When the actuator is activated, the flexible layer 701 is bent to form a gap 505 that facilitates a separation of 3D-printed object 101 off of the build platform 700.

FIG. 8 illustrates a flow chart of a method in accordance with some exemplary embodiments of the present invention. More specifically, this figure shows method 800, which may include the steps of: (801) creating a 3D-printed object on a flexible build platform; (802) applying a force to a portion of the flexible build platform to bend at least a portion of the flexible build platform; and (803) separating the 3D-printed object from the flexible build platform.

Figure 9:
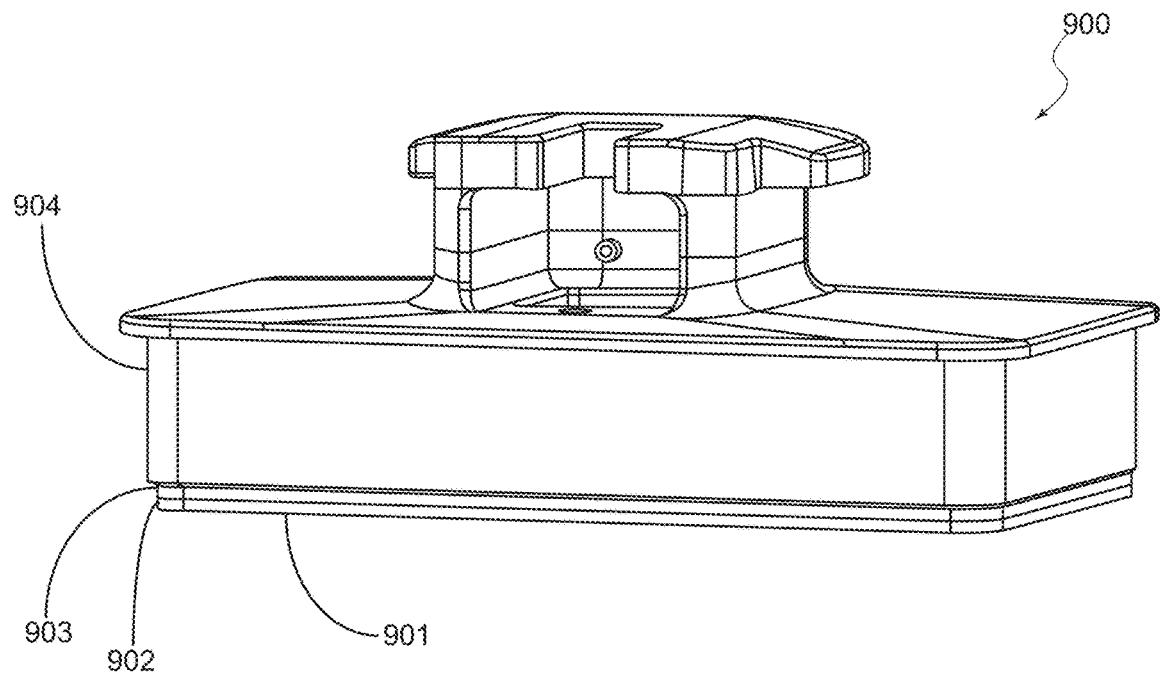
FIG. 9 illustrates a build platform in accordance with some exemplary embodiments of the present invention.
Figure 10:
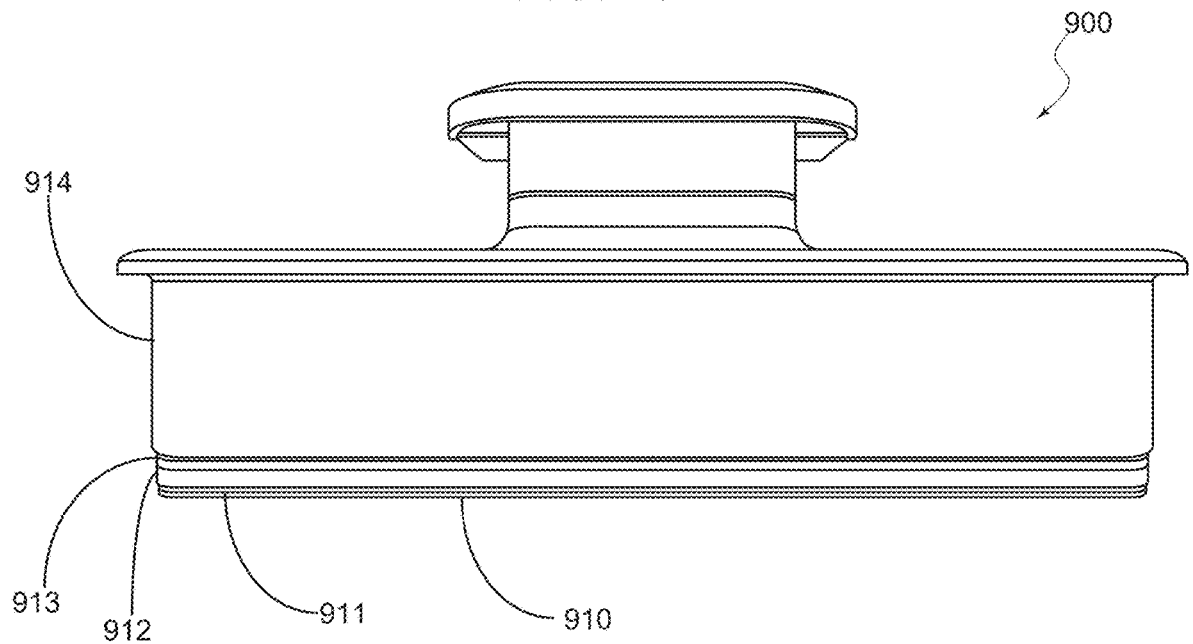
FIG. 10 illustrates a build platform in accordance with some exemplary embodiments of the present invention.

Turning now to the next set of figures, FIG. 9 and FIG. 10 illustrate build platforms in accordance with some exemplary embodiments of the present invention. More specifically, these figures show exemplary embodiments in accordance with some aspects of the invention that involve a build platform for a stereolithographic printer that includes an alignment module. The build platform may comprise a removable build plate having a build surface for building 3D-printed objects on the build platform, a base assembly removably coupled to the removable build plate, and a magnetic alignment module adapted to magnetically move the removable build plate along a surface of the base assembly such that the removable build plate automatically self-aligns along a boundary of the base assembly and magnetically couples to the base assembly.

To these ends, a build platform such as build platform 900, may include several layers, as shown in each figure. In FIG. 9, build platform 900 is shown with four basic layers or portions of the build platform. For example, a carbon fiber layer 901 may be suitable for a build plate of the build platform. Layer 902 may be a composite layer that is integral with or is adhered to layer 901, and which is embedded with magnets. Layer 903 may be an aluminum plate that forms a top layer or surface of a build assembly to which the build plate (layers 901 and 902) is magnetically coupled to. Like layer 902, layer 903 may comprise embedded magnets or magnetic components. Layer 904 forms a rigid layer or structure for the base assembly of the build platform 900. This layer may comprise aluminum or steel, or a similarly suitable hard but light-weight material.

In FIG. 10, build platform 900 is shown with five layers or portions of the build platform. For example, a spring steel layer 910 may be suitable for a build plate of the build platform. Layer 911 may be a composite layer that is integral with or is adhered to layer 910, and which is embedded with magnets. Layer 912 may include a rubber layer or the like. Layer 913 may include aluminum plate that forms a top layer or surface of a build assembly to which the build plate is magnetically coupled to. Like layer 910, layer 913 may comprise embedded magnets or magnetic components. Layer 914 forms a rigid layer or structure for the base assembly of the build platform 900. This layer may comprise aluminum or steel, or a similarly suitable hard but light-weight material.

Figures 11A, 11B:
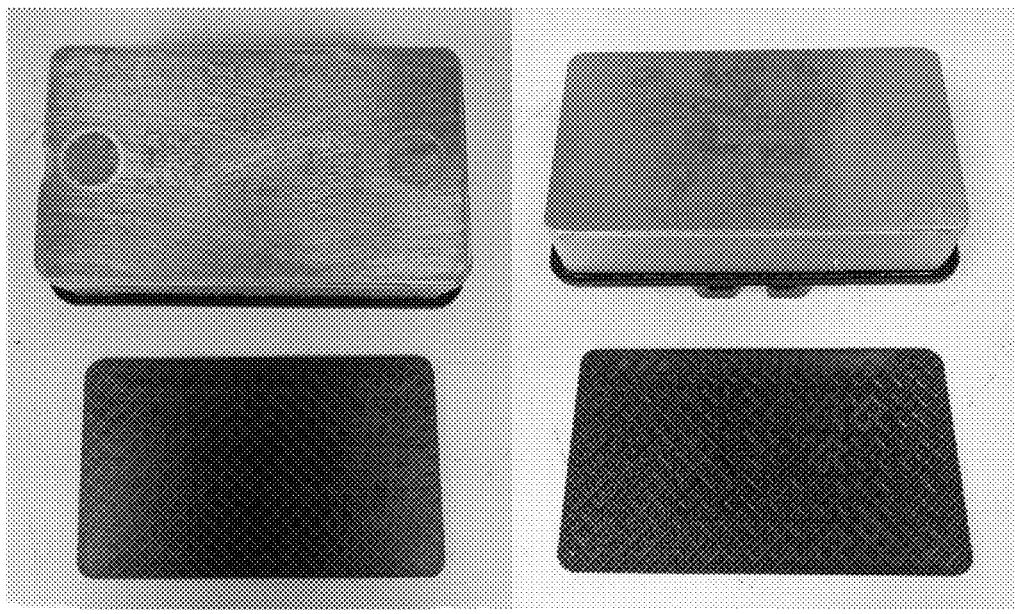
FIG. 11A-11B illustrate various build plates and build platforms in accordance with some exemplary embodiments of the present invention.
Figures 12A, 12B:
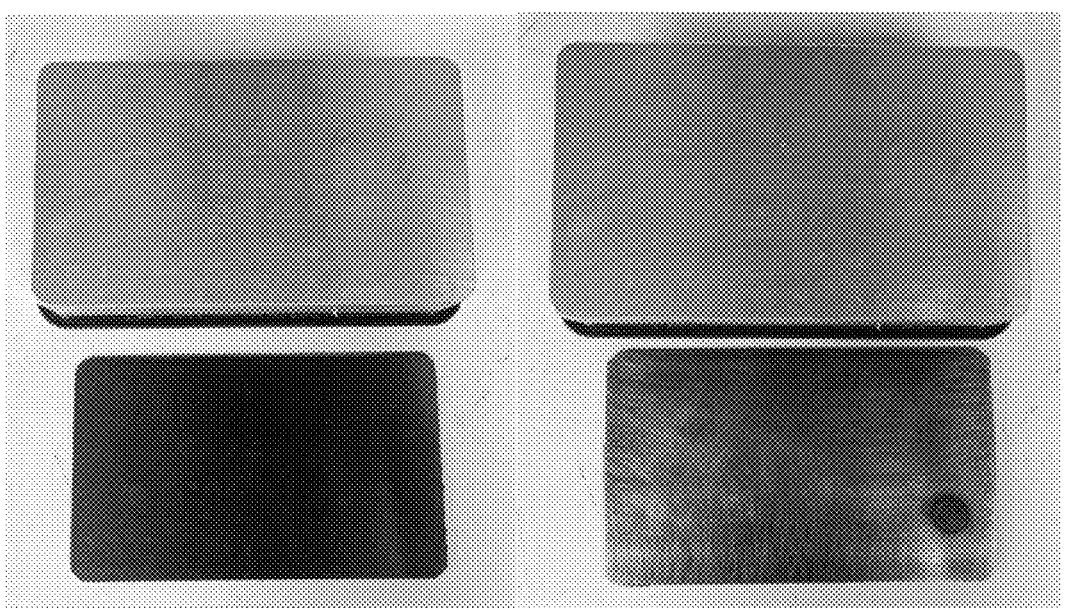
FIG. 12A-12B illustrate various build plates and build platforms in accordance with some exemplary embodiments of the present invention.

In exemplary embodiments, build plate surfaces may include carbon fiber or spring steel. To improve accuracy and reliability of 3D prints, sanded and or textured versions of both these materials may be employed as well. FIG. 11A-11B are images of two types of build platforms in accordance with some exemplary embodiments of the present invention. FIG. 11A shows an aluminum base assembly above a sanded carbon fiber build plate. FIG. 11B shows an aluminum base assembly above a carbon fiber build plate, wherein the carbon fiber surface has been machine-grooved. FIG. 12A-12B are images of two other types of build platforms in accordance with some exemplary embodiments of the present invention. FIG. 12A shows a smooth aluminum base assembly above a smooth carbon fiber build plate. FIG. 12B shows a sanded aluminum base assembly above a sanded spring steel build plate.

As will be described in more detail below, in some embodiments of the present invention, there are important objectives for a removable build plate, including but not limited to auto-alignment, sealability, and easy removal.

Figure 13:
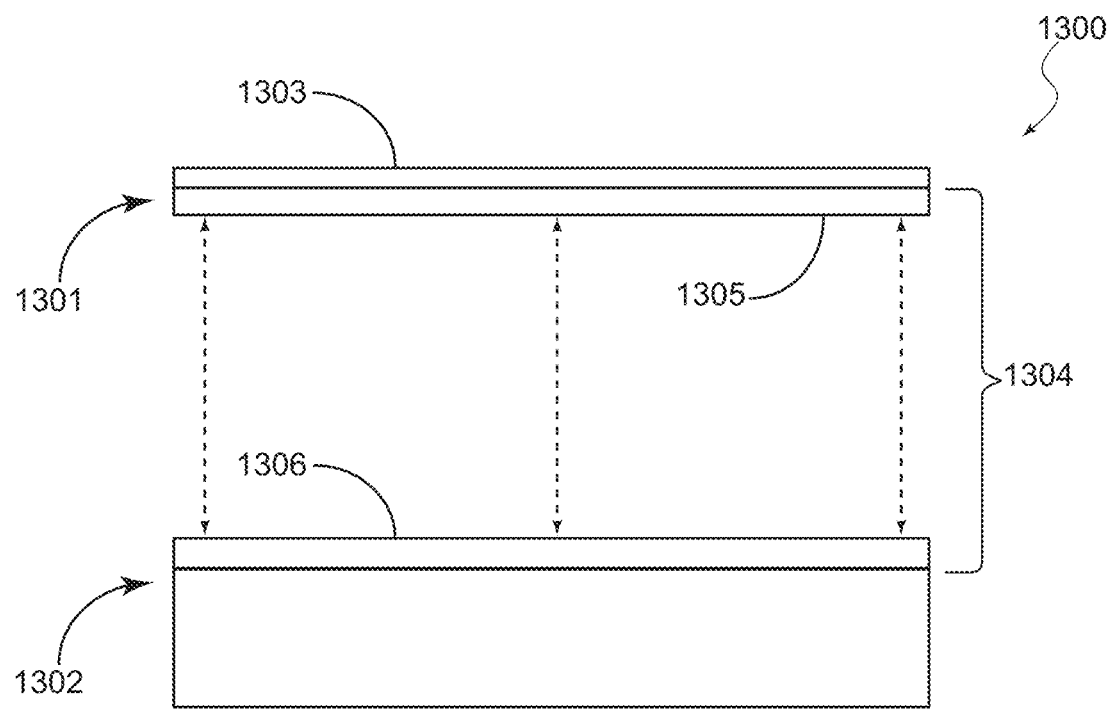
FIG. 13 illustrates a build platform in accordance with some exemplary embodiments of the present invention in which an alignment module is employed.

Turning to the next figure, FIG. 13 illustrates a build platform in accordance with some exemplary embodiments of the present invention in which an alignment module is employed. What makes a removable build plate in accordance with at least one embodiment of the present invention unique is the configuration and use of an alignment module adapted to auto-align, in addition to specifically securing the build plate to a base assembly of the build platform. The auto-alignment capability ensures the build plate is lined up against the platform properly, since if the plate is misaligned, this could result in a damaged resin tank, and/or failed prints.

As shown in FIG. 13, a build platform 1300 in accordance with the present invention, may comprise a removable build plate 1301 having a build surface 1303 for building 3D-printed objects on the build platform; a base assembly 1302 removably coupled to the removable build plate 1301; and an alignment module 1304 adapted to magnetically move the removable build plate along a surface 1306 of the base assembly 1302 such that the removable build plate 1301 automatically self-aligns along a boundary of the base assembly 1302 and magnetically couples to the base assembly 1302.

Figure 14:
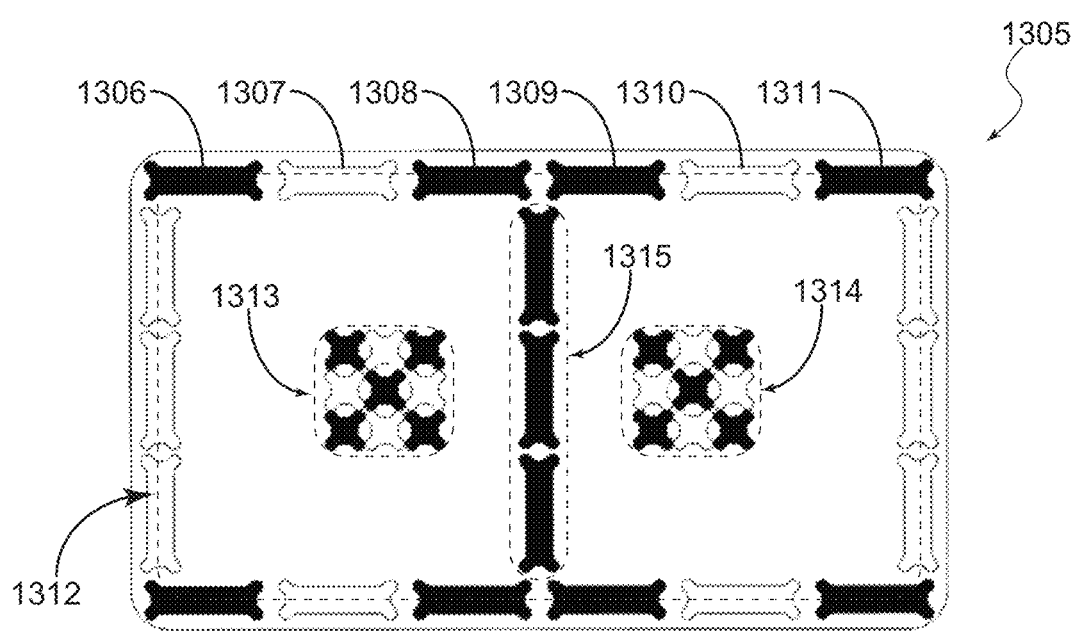
FIG. 14 illustrates a layer or substrate employed by an alignment module on which a plurality of magnets is dispose in accordance with some exemplary embodiments of the present invention.

In some exemplary embodiments, a set of magnets are disposed on corresponding substrates 1305 and 1306 of the removable build plate 1301 and the base assembly 1302, respectively. FIG. 14 illustrates a layer or substrate employed by alignment module 1304 on which a plurality of magnets is dispose in accordance with some exemplary embodiments of the present invention.

For example, and without limiting the scope of the present invention, a substrate 1305 may be attached or adhered to a surface of build plate 1301, underneath printable surface 1303 and embed a plurality of magnets inside or within the substrate 1305. In exemplary embodiments, a first configuration of magnets are disposed on a surface of the removable build plate—for example on a substrate 1305—such that a first set of magnets 1306, 1307, 1308, 1309, 1310, and 1311—are distributed along a perimetrical boundary 1312 of the surface of the substrate, and a second set of the magnets are distributed in two clusters 1313 and 1314 along a center region of the surface or substrate 1305, the center region divided by a centric boundary 1315. In this configuration, and as shown, magnets 1306, 1308, and 1309, for example, may have a first polarity (a north polarity for example) and magnets 1307, 1310, may have the opposite polarity (a south polarity for example). When coupled against a second surface of the alignment module, such as substrate 1306, the interaction of the alternate polarities guide the removable build plate into an aligned position on a surface of the base assembly 1302.

Accordingly, a second configuration of magnets disposed on a surface or substrate 1306 of the base assembly correspond to but have opposite polarity to each of the first configuration of magnets disposed on the surface or substrate 1305 of the removable build plate.

Figure 15:
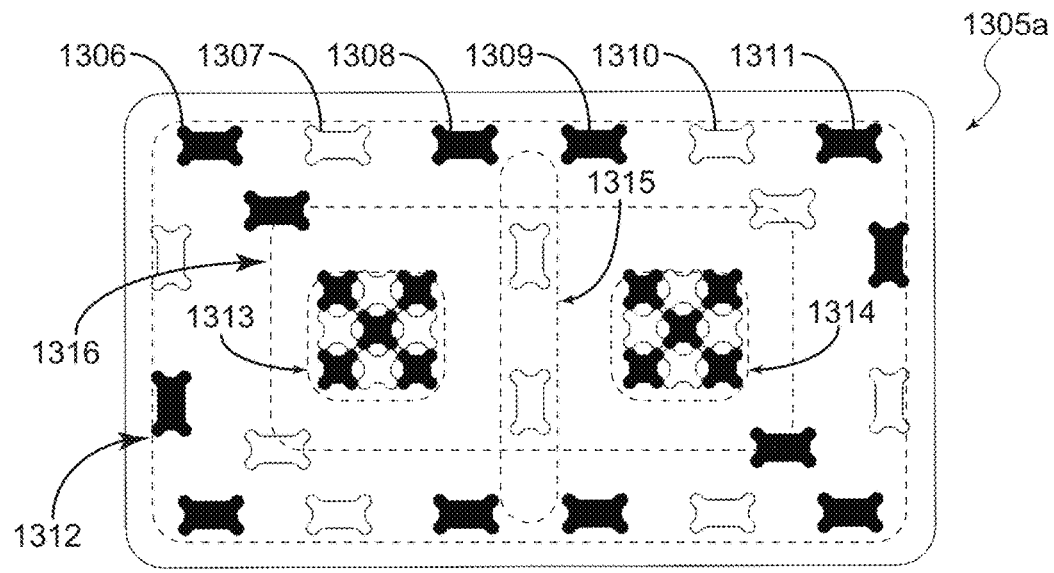
FIG. 15-FIG. 15A illustrate a layer or substrate employed by an alignment module on which a plurality of magnets is dispose in accordance with some exemplary embodiments of the present invention.

FIG. 15 illustrates a layer or substrate 1305a employed by an alignment module on which a plurality of magnets is dispose in accordance with some exemplary embodiments of the present invention. In this configuration, a plurality of magnets is spaced apart such that another boundary 1316 surrounds the two central magnet clusters separated by the central boundary 1315. As with the embodiment shown in FIG. 14, a corresponding plate with a complimentary configuration of magnets disposed on a surface or substrate of the base assembly will correspond to but have opposite polarity to each of the first configuration of magnets disposed on the surface or substrate 1305a of the removable build plate.

Figure 15A:
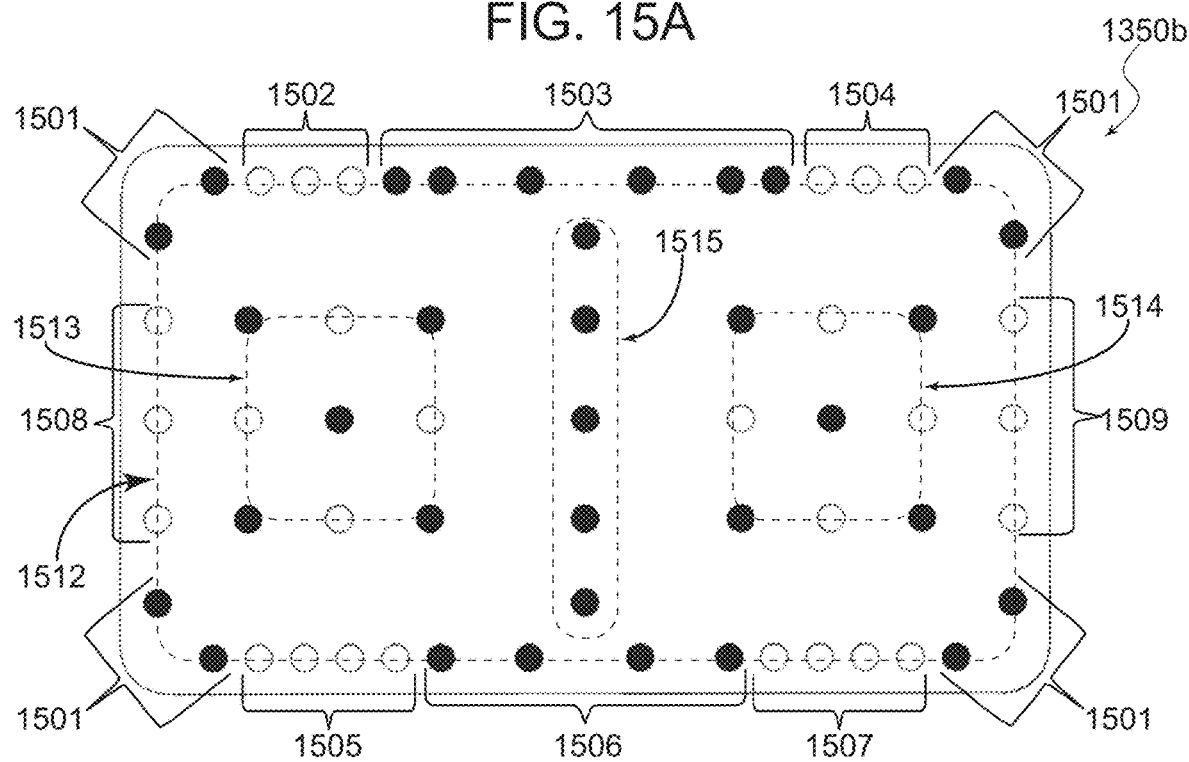

FIG. 15A illustrates a substrate or layer 1305b employed by an alignment module on which a plurality of magnets is dispose in accordance with some exemplary embodiments of the present invention. Layer 1305b may comprise of a plurality of cavities or apertures in which a plurality of magnets or magnetic components may be disposed on layer 1505b. In some exemplary embodiments, the magnets are configured as shown with a first plurality or set of magnets disposed along an outer or perimetrical boundary 1512 that generally follows the perimeter of layer 1305b. A second plurality or set of magnets may be disposed within two separate boundaries 1513 and 1514, wherein each group of magnets forms a cluster of magnets within each of these two boundaries. A third plurality or set of magnets may be disposed along a central boundary 1515 which runs along a center region of the layer 1305b. In the shown embodiment, the first set of magnets disposed along the outer or perimetrical boundary 1512 include a set of two magnets at each of the corners 1501, and a plurality of magnets along the entire lengths of the perimetrical boundary 1512 at locations 1502, 1503, 1504, 1505, 1506, and 1507; as well as along the shorter lengths of the perimetrical boundary 1512 at locations 1508, and 1509. Notably: the corner magnets 1501 are the same polarity magnets; magnets at locations 1502 and 1504, which are opposite to magnets at location 1505 and 1507, are same polarity, just as magnets located at 1503 and 1506; similarly, magnets located at oppose sides of the shorter length of layer 1305b, at 1508 and 1509, are magnets positioned so that they have the same polarity as well. The second set of magnets in clusters or within boundaries 1513 and 1514, have the same polarity pattern. The third set of magnets within boundary 1515 have the same polarity as those in regions 1503 and 1506. This configuration allows the build plate to automatically self-align; as such, a build plate with this configuration of magnets (and a complementary set of magnets on the base assembly with the same configuration but opposite polarity) is adapted to magnetically move the removable build plate along a top surface of the base assembly such that the removable build plate automatically self-aligns along a boundary of the base assembly and magnetically couples to the top surface of the base assembly.

In some exemplary embodiments, a build platform 1300 for a stereolithographic printer, may comprise: a removable build plate 1301 having a flexible build surface 1303 for building 3D-printed objects on the build platform 1300; a base assembly 1302 removably coupled to the removable build plate 1301; and an alignment module 1304, comprising: a first configuration of magnets disposed on a surface 1305 of the removable build plate such that a first set of magnets are distributed along a perimetrical edge of the surface, and a second set of the magnets are distributed in two clusters along a center region of the surface; and a second configuration of magnets disposed on a surface of the base assembly that correspond to but have opposite polarity to each of the first configuration of magnets disposed on the surface of the removable build plate; wherein the magnetic alignment module is adapted to magnetically move the removable build plate along a top surface of the base assembly such that the removable build plate automatically self-aligns along a boundary of the base assembly and magnetically couples to the top surface of the base assembly.

FIG. 16 illustrates a top view of a base assembly for a build platform in accordance with some exemplary embodiments of the present invention. More specifically, this figure shows base assembly 1600, which includes a top surface 1601 adapted to receive a build plate. In exemplary embodiments of the present invention, such as the embodiment shown in this view, base assembly 1600 includes a raised edge 1602 adapted to register with and facilitate alignment of a removable build plate on the surface 1601 of the base assembly 1600. The edge 1602 may be a gradually rising edge that runs around a portion of a perimeter of the base assembly or perimeter of the surface 1601.

Figure 17:
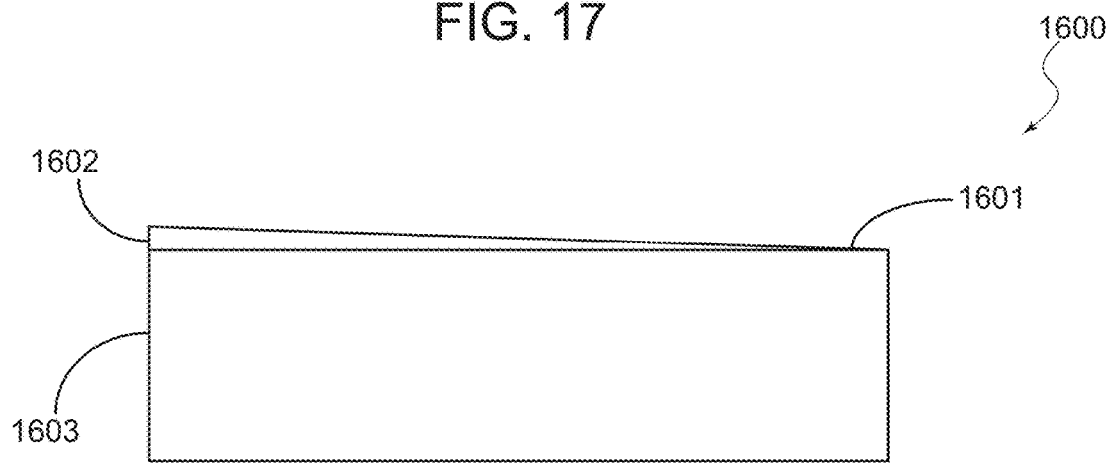
FIG. 17 illustrates a side view of base assembly 1600 in accordance with some exemplary embodiments of the present invention.

FIG. 17 illustrates a side view of base assembly 1600, from which it may be appreciated that raised edge 1602 is gradual along opposite sides of the base assembly. Typically, the edge is planar along a length of the base assembly in order to provide a backing or support for the build plate that is slid in place when coupled to the base assembly 1600.

Figure 18:
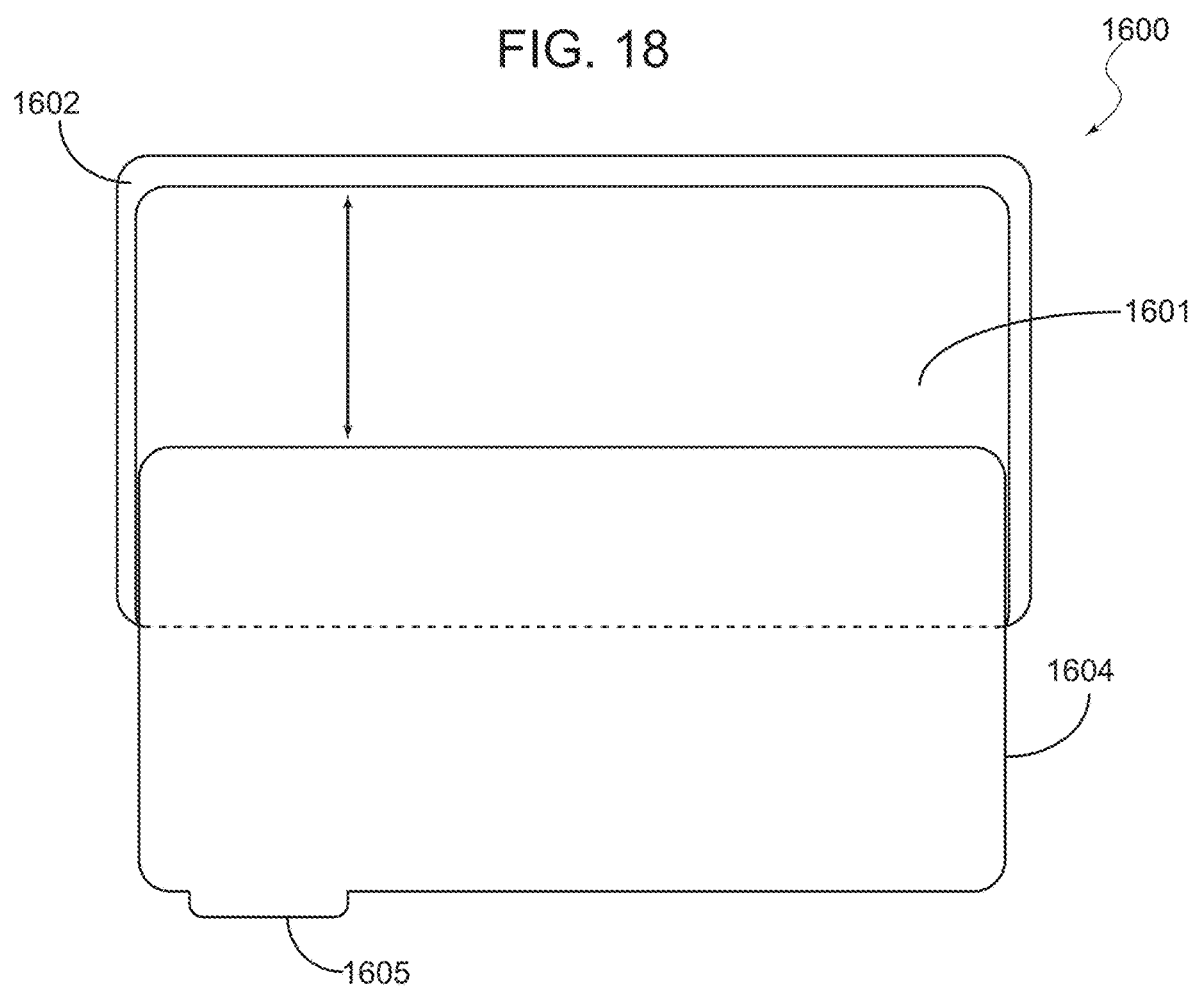
FIG. 18 illustrates a top view of base assembly 1600, showing a removable build plate moving or sliding into an aligned position on a surface of the base assembly 1600, in accordance with some exemplary embodiments of the present invention.

FIG. 18 illustrates a top view of base assembly 1600, showing a removable build plate 1604 moving or sliding into an aligned position on a surface 1601 of the base assembly 1600, in accordance with some exemplary embodiments of the present invention. The magnetic forces of the magnets guide or magnetically move the removable build plate 1604 along the top surface 1601 of the base assembly 1600 such that the removable build plate 1604 automatically self-aligns along a boundary (in exemplary embodiments the boundary aligns with raised edge 1602) of the base assembly and magnetically couples to the top surface 1601 of the base assembly 1600.

In some exemplary embodiments, removable build plate 1604 includes a tab 1605 extending from the flexible surface of removable build plate 1604. Tab 1605 facilitates manual placement or removal of the removable build plate 1604 on the base assembly 1600. In some exemplary embodiments, as will be discussed further below, the base assembly 1600 may further include a recessed edge along a side surface of the base assembly to facilitate manual placement or removal of the removable build plate.

Figure 19:
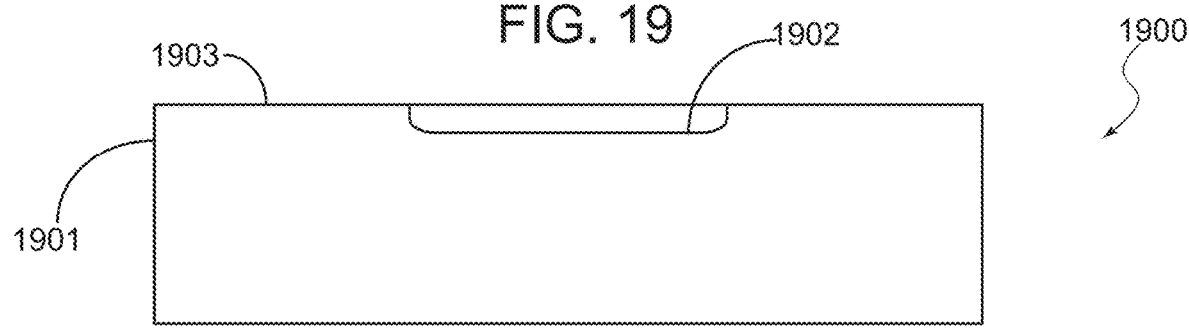
FIG. 19 illustrates a front view of a base assembly in accordance with some exemplary embodiments of the present invention.
Figure 20:
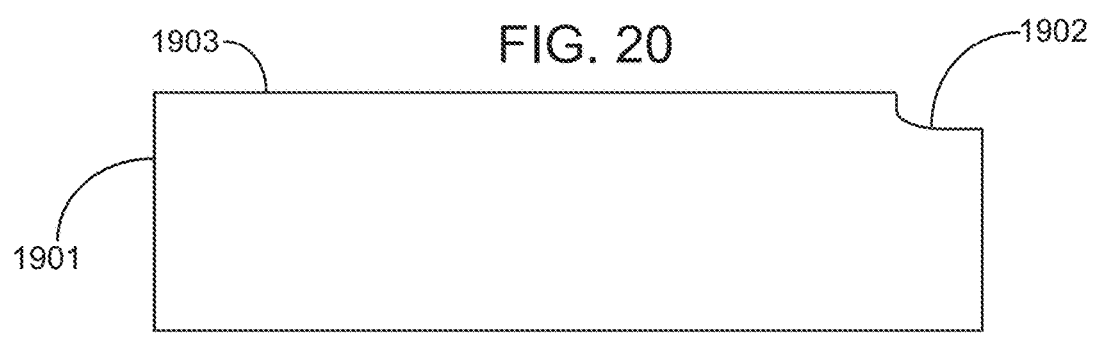
FIG. 20 illustrates a side view of base assembly 1900 in accordance with some exemplary embodiments of the present invention.
Figure 21:
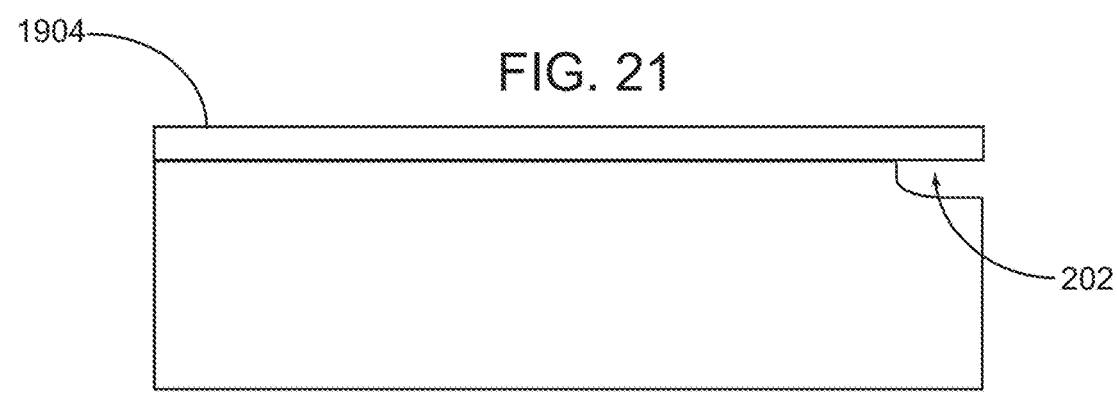
FIG. 21 illustrates a side view of base assembly 1900, showing an edge that facilitates removal of a removable build plate positioned on a surface of the base assembly, in accordance with some exemplary embodiments of the present invention.

Turning to the next set of figures, FIG. 19 illustrates a front view of a base assembly 1900 in accordance with some exemplary embodiments of the present invention; FIG. 20 illustrates a side view thereof; and FIG. 21 illustrates a side view of the base assembly 1900, showing a recessed edge 1902 that facilitates removal of a removable build plate 1904, when it is positioned on the top surface 1903 of the base assembly 1901. From these views, it may be appreciated that the recessed edge 1902 creates a crevasse 202 that allows a user to easily lift the removable build plate 1904 from the top surface 1903 of the base assembly 1901.

Figure 22:
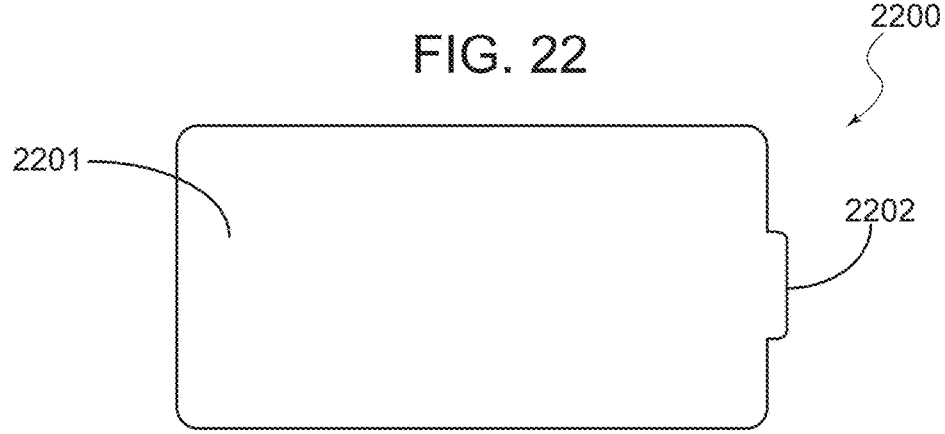
FIG. 22 illustrates a top view of a build plate including a protruding edge or tab to facilitate placement or removal, in accordance with some exemplary embodiments of the present invention.

FIG. 22 illustrates a top view of a build plate including a protruding edge or tab to facilitate placement or removal, in accordance with some exemplary embodiments of the present invention. In tis view an alternative position for a tab such as ta 2202 is shown. In this embodiment, the removable build plate 2200 includes a flexible printable surface 2201 from which a tab 2202 extends from. Tab 2202 facilitates manual placement or removal of the removable build plate 2200 on a base assembly. As indicated in other shown embodiments, tab 2202 may be positioned along any length of the removable build plate 2200.

Figure 23:
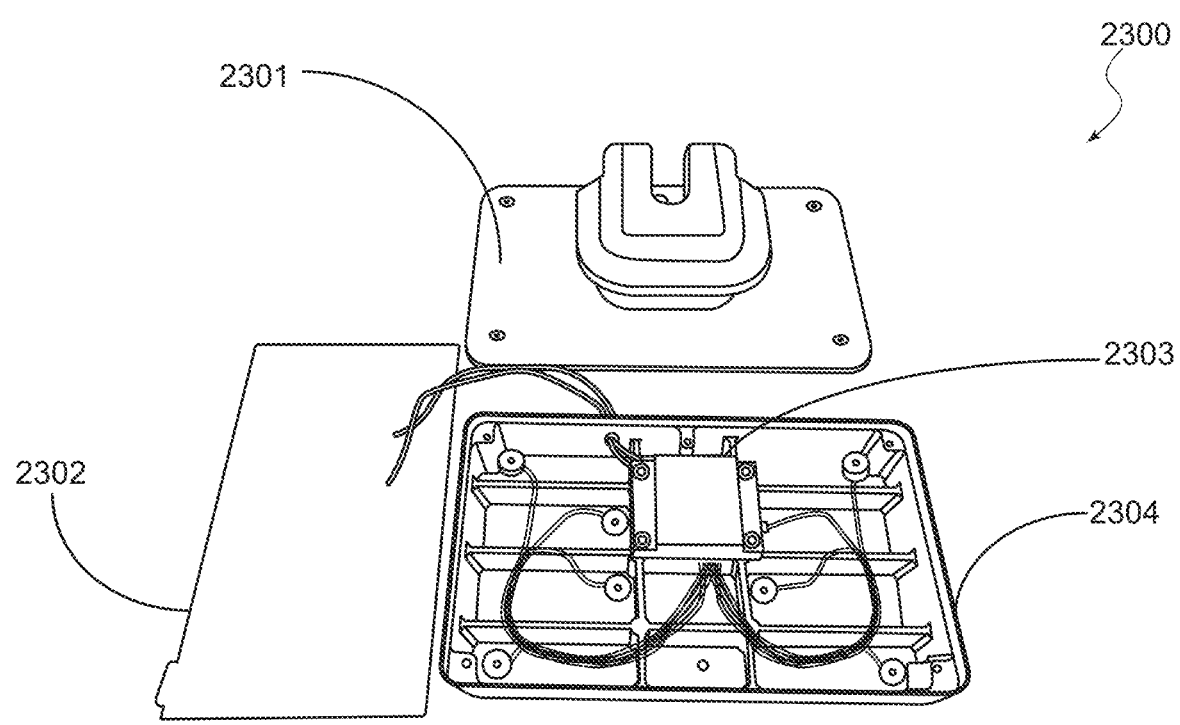
FIG. 23-25 are images of a build platform in accordance with some exemplary embodiments of the present invention.
Figure 24:
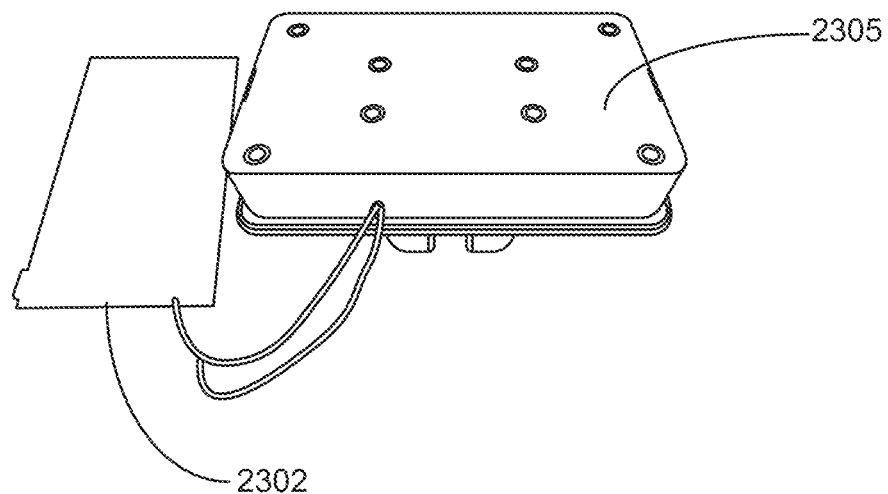
Figure 25:
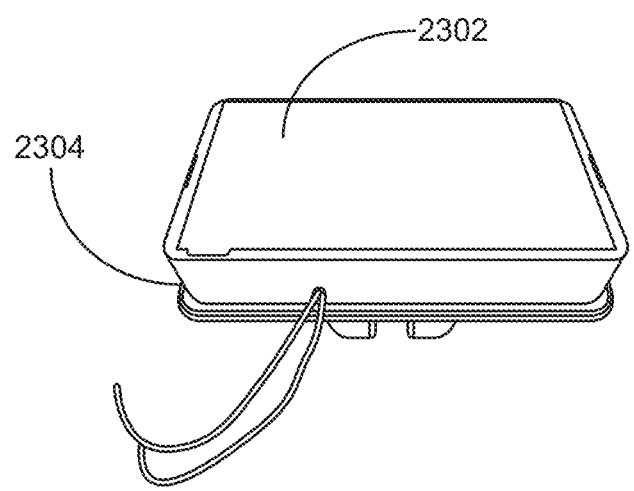

FIG. 23-25 are images of a build platform in accordance with some exemplary embodiments of the present invention. More specifically, FIG. 23 shows an image of a disassembled build platform 2300 comprising an alignment module 2303 that includes an electromagnet housed inside the base assembly 2304. A build plate 2302 and a platform lid 2301 are shown decoupled from the base assembly 2304. A plurality of electromagnets 2305 are shown disposed in an interior of the base assembly 2304, wherein the plurality of electromagnets 2305 will conduct an attractive force through the surface of the base assembly 2304 in order to automatically self-align the build plate 2302 along a boundary of the base assembly 2304 and magnetically couple build plate 2302 to the top surface of the base assembly 2304. In some exemplary embodiments, the removable build plate 2302 includes a ferromagnetic surface that magnetically couples to the surface of the base assembly. In other exemplary embodiments, build plate 2302 includes a substrate with magnets embedded therein.

In some exemplary embodiments, the build platform may further include a sensor coupled to the base assembly 2304 that is adapted to detect whether the removable build plate 2302 is coupled on the base assembly 2304.

Turning now t the next set of figures, FIG. 26-FIG. 28 illustrate a build plate for a build platform to which a seal has been applied, in accordance with some exemplary embodiments of the present invention. Because forming material such as resin can get between layers of materials, and especially get between the platform and build plate, with no chance to remove during the wash cycles, a seal may be desirable. One type of sealing mechanism that may be employed is a face seal, in which a layer of, for example and without limiting the scope of the present invention, rubber, (ie., Neoprene, Silicone etc.), is applied. In some exemplary embodiments, a flat durable material with minimum thickness is preferred.

In some exemplary embodiments, as shown in FIG. 26, a sealing surface 2603 is used to cover a layer 2602 that is embedded with magnets or magnetic components of build plate 2600, so that the sealing surface 2603 sandwiches layer 2602 between it and printing surface 2601. In some exemplary embodiments, as shown in FIG. 27, on the base assembly 2700, a second sealing surface 2701 may be secured to seal a layer 2702 that is embedded with magnets or magnetic the base assembly 2700.

Another type of sealing mechanism is an edge seal. FIG. 28 illustrates a build plate for a build platform to which a seal has been applied along an edge of the build platform, in accordance with some exemplary embodiments of the present invention. Build platform 2800 includes a surface 2802 which is surrounded by a sealing surface covering an edge 2801 of the removable build plate that creates a seal between the removable build plate and the base assembly. Because the idea is to keep the surface of the build plate flat, employing the seal may require a build plate surface structure that accommodates the seal.

For example, FIG. 28A-FIG. 28B illustrate cross-sectional views of exemplary embodiments of the present invention wherein a build plate for a build platform employs a sealing material 2803 along an edge (FIG. 28A) and along the top surface (FIG. 28A) of the build plate 2800.

In FIG. 28A, an exemplary cross-section of a first embodiment is shown along line segment A-A (see FIG. 28) whereby surface 2802 of build platform 2800 includes a sealing component 2803 that sits on edge 2801*a* that has a surface that is recessed or lower than the surface 2802 of the build plate 2800. Between this recessed edge 2801*a* and the higher surface 2802, a sealing component 2803 may be disposed. The sealing component 2803 may comprise of a softer material, such as but not limited to silicone component, a synthetic rubber and fluoropolymer elastomer such as Viton®, a ethylene propylene diene monomer (EPDM) rubber, or other types of similar materials may be used.

In another embodiment, as shown FIG. 28B—a cross-section along line segment A-A (see FIG. 28)—it is the surface 2802 of build platform 2800 that is recessed or lower with reference to a surface of edge 2801 and which is filled with the sealing component 2803. That is, in this embodiment, the sealing material 2803 is disposed on the top of the recessed surface 2802. Notably, in either embodiments of FIG. 28A or FIG. 28B, a flat planar surface is achieved.

Figure 29:
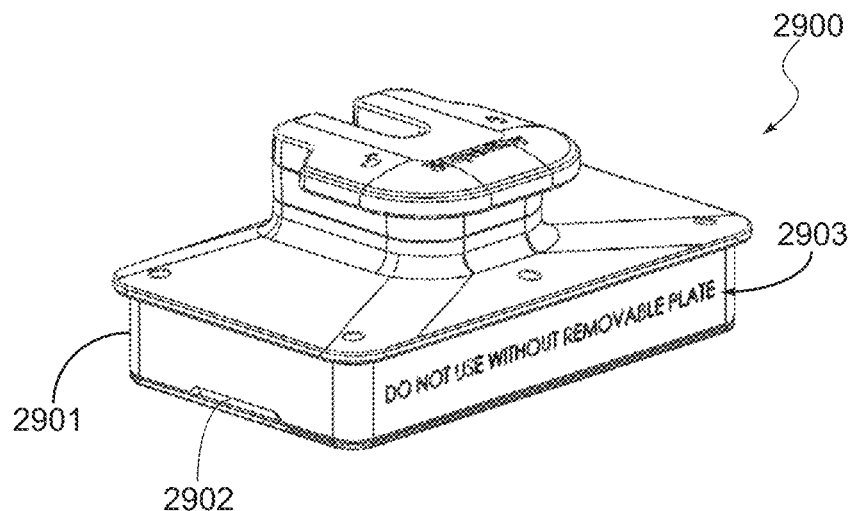
FIG. 29 illustrates a build platform labeled for ease of use, in accordance with some exemplary embodiments of the present invention.

Since the build plate is removable and may require cleaning from time to time, it may be desirable to alert users to make sure the building platform is coupled to the removable build plate. As such, as shown in FIG. 29, a build platform 2900 may be labeled 2903 for ease of use, in accordance with some exemplary embodiments of the present invention. In this shown embodiment. Build platform 2900 includes a base assembly 2901 that employs a recessed edge 2902.

Figure 30:
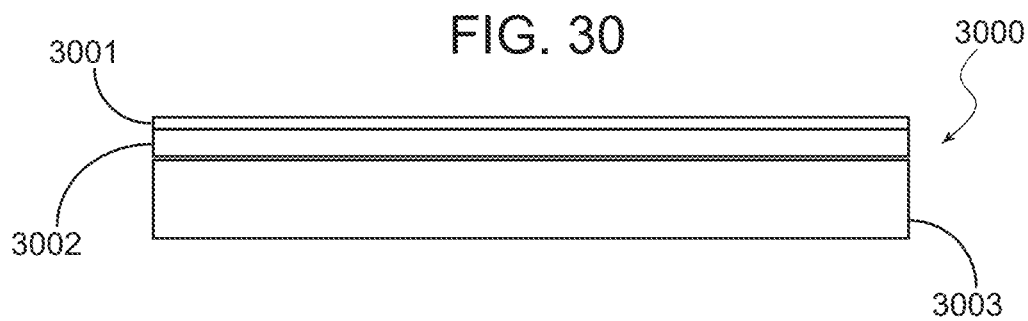
FIG. 30 illustrates a build platform in accordance with some exemplary embodiments of the present invention.
Figure 30A:
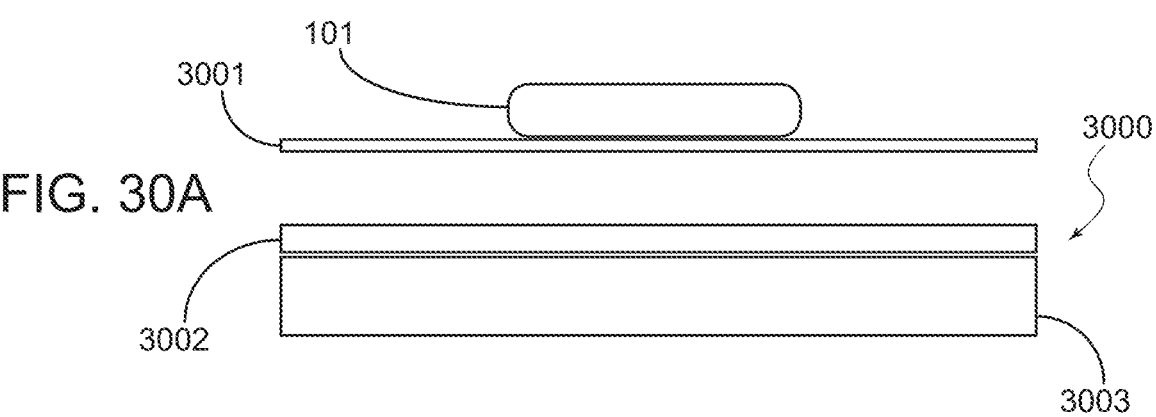
FIG. 30A-FIG. 30B illustrate a method that may be performed by build platform 3000 in accordance with the present invention.
Figure 30B:
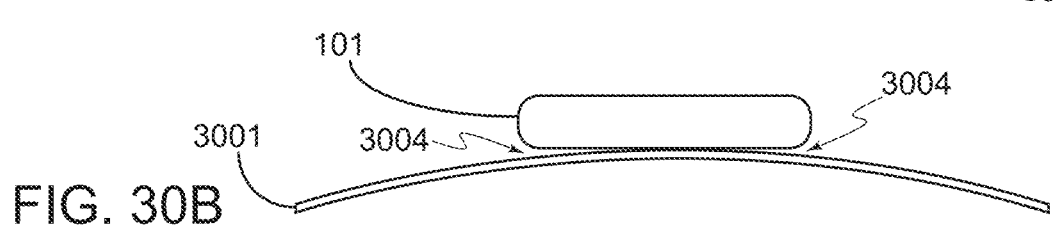

Finally turning to the last set of figures, FIG. 30 illustrates another build platform in accordance with some exemplary embodiments of the present invention. In this embodiment, a build platform 3000 may include a first flat surface 3002 of preferably an impermeable material, and a second flat surface 3001 of a similarly flat impermeable material that can be used as a printing surface; the second flat surface 3002 may be secured to a base assembly 3003 of a build platform. The flat impermeable material for surface 3001 and 3002 may be for example, and without limiting the scope of the present invention, tempered glass. When an object is printed on surface 3001, surface 3001 may be removed from surface 3002. Because surface 3001 is flexible, a separation(s) 3004 between the printed objected and the flexible surface is created, and the printed object will be easily peeled therefrom, as shown in FIG. 30A-FIG. 30B.

For example, affixing an upper tempered glass sheet to an aluminum base on the print platform using epoxy and allow it to cure. It is important that the tempered glass be made to be as flat as possible as it cures. The second piece of tempered glass may be placed onto the first piece of tempered glass so that their two coated faces touched one another, creating the required suction force to keep the second glass piece fixed while print is performed. After successful printing, the top layer of tempered glass will easily peel off of the lower layer of tempered glass, and the part is easily removed from the glass by flexing it by hand.

A system and method for facilitating separation of 3D-printed objects from build platforms has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A build platform for a stereolithographic printer, comprising:
   a removable build plate having a build surface for building three-dimensionally (3D) printed objects on the build platform and a first coupling surface, the first coupling surface including a first surface first side, a first surface second side opposite the first surface first side, a first surface front side and a first surface rear side;
   a base assembly having a second coupling surface removably securable to the first coupling surface, the second coupling surface including a second surface first side, a second surface second side opposite the second surface first side, a second surface front side, and a second surface rear side, the second surface front side and the second surface rear side defining a front-to-rear axis; and
   an alignment module adapted to receive the first surface rear side and to magnetically move the first surface rear side in a direction of the front-to-rear axis and towards the second surface rear side and without rotation such that the removable build plate automatically self-aligns along a boundary of the base assembly and magnetically couples to the base assembly, the alignment module comprising:
      two or more first magnets disposed on the first coupling surface, a first one of the two or more first magnets positioned along the first surface first side and between the first surface front side and the first surface rear side, a second one of the two or more first magnets positioned along the first surface second side and between the first surface front side and the first surface rear side, and a third one of the two or more first magnets positioned between the first one of the two or more first magnets and the second one of the two or more first magnets and between the first surface front side and the first surface second side, the first one of the two or more first magnets and the second one of the two or more first magnets each having a first polarity and the third one of the two or more first magnets having a second polarity, the second polarity opposite the first polarity;
      two or more second magnets disposed on the second coupling surface that correspond to but have opposite polarity to the two or more first magnets disposed on the first coupling surface.

2. The build platform of claim 1, wherein the alignment module further comprises:
   a first subset of the two or more first magnets distributed along a perimetrical boundary of the first coupling surface, and a second subset of the two or more first magnets distributed in two clusters along a center region of the first coupling surface.

3. The build platform of claim 1, wherein the first and second coupling surfaces are disposed on corresponding substrates of the removable build plate and the base assembly.

4. The build platform of claim 1, wherein the alignment module comprises an electromagnet housed inside the base assembly.

5. The build platform of claim 4, wherein the removable build plate includes a ferromagnetic surface that magnetically couples to the surface of the base assembly.

6. The build platform of claim 1, wherein the second coupling surface includes a raised edge adapted to register with and facilitate alignment of the removable build plate on the second coupling surface of the base assembly.

7. The build platform of claim 1, further comprising a sensor coupled to the base assembly and adapted to detect whether the removable build plate is coupled on the base assembly.

8. The build platform of claim 1, further comprising a sealing surface on the base assembly or the removable build plate that creates a seal between the removable build plate and the base assembly.

9. The build platform of claim 1, further comprising a sealing surface covering an edge of the removable build plate that creates a seal between the removable build plate and the base assembly.

10. The build platform of claim 1, wherein:
    the removable build plate includes a tab extending from the first coupling surface to facilitate manual placement or removal of the removable build plate on the base assembly; or
    the base assembly includes a recessed edge along a side surface of the base assembly to facilitate manual placement or removal of the removable build plate.

11. The build platform of claim 1, wherein the two or more second magnets include a first one of the two or more second magnets that corresponds to the first one of the two or more first magnets but with opposite polarity, a second one of the two or more second magnets that corresponds to the second one of the two or more first magnets but with opposite polarity, and a third one of the two or more second magnets that corresponds to the third one of the two or more first magnets but with opposite polarity, and wherein the first one of the two or more second magnets magnetically attracts the first one of the two or more first magnets and magnetically repels the third one of the two or more first magnets, the second one of the two or more second magnets magnetically attracts the second one of the two or more first magnets and magnetically repels the third one of the two or more first magnets, and the third one of the two or more second magnets magnetically attracts the third one of the two or more first magnets and magnetically repels the first one of the two or more first magnets and the second one of the two or more first magnets thereby causing the first surface rear side to move in the direction of the front-to-rear axis and towards the second surface rear side and without rotation.

12. The build platform of claim 1, wherein the first one of the two or more first magnets includes a first magnet body, the second one of the two or more first magnets includes a second magnet body, and the third one of the two or more first magnets includes a third magnet body, and at least a portion of the first magnet body, at least a portion of the second magnet body, and at least a portion of the third magnet body are laterally aligned with one another along an axis that is orthogonal to the front-to-rear axis.

13. The build platform of claim 12, wherein the first magnet body includes a first midpoint, the second magnet body includes a second midpoint, and the third magnet body includes a third midpoint, and the first midpoint, the second midpoint, and the third midpoint are laterally aligned with one another along the axis that is orthogonal to the front-to-rear axis.

14. The build platform of claim 1, the alignment module comprising:
a fourth one of the two or more first magnets positioned along the first surface first side and between the first one of the two or more first magnets and the first surface rear side, a fifth one of the two or more first magnets positioned along the first surface second side and between the second one of the two or more first magnets and the first surface rear side, and a sixth one of the two or more first magnets positioned between the fourth one of the two or more first magnets and the fifth one of the two or more first magnets and between the third one of the two or more first magnets and the first surface second side, the fourth one of the two or more first magnets and the fifth one of the two or more first magnets each having the first polarity and the sixth one of the two or more first magnets having the second polarity.

15. The build platform of claim 14, the alignment module comprising:
a fourth one of the two or more second magnets positioned along the second surface first side and between the first one of the two or more second magnets and the second surface rear side, a fifth one of the two or more second magnets positioned along the second surface second side and between the second one of the two or more second magnets and the second surface rear side, and a sixth one of the two or more second magnets positioned between the fourth one of the two or more second magnets and the fifth one of the two or more second magnets and between the third one of the two or more second magnets and the second surface second side, the fourth one of the two or more second magnets and the fifth one of the two or more second magnets each having the second polarity and the sixth one of the two or more second magnets having the first polarity.

16. A build platform for a stereolithographic printer, comprising:
a removable build plate having a build surface for building three-dimensionally (3D)-printed objects on the build platform and a first coupling surface;
a base assembly having a second coupling surface removably coupled to the first coupling surface; and
an alignment module adapted to magnetically move the first coupling surface along the second coupling surface such that the removable build plate automatically self-aligns along a boundary of the base assembly and magnetically couples to the base assembly, the alignment module comprising:
two or more first magnets disposed on the first coupling surface;
two or more second magnets disposed on the second coupling surface that correspond to but have opposite polarity to the two or more first magnets disposed on the first coupling surface; and
a raised edge coupled about a perimeter of the second coupling surface.

17. The build platform of claim 16 wherein the raised edge includes a gap sized to receive at least a portion of the first coupling surface.

18. The build platform of claim 16 wherein a first at least one of the two or more first magnets includes a first polarity and a second at least one of the two or more first magnets includes a second polarity, the second polarity opposite the first polarity.

19. The build platform of claim 16 wherein a first subset of the two or more first magnets is distributed along a perimetrical boundary of the first coupling surface, and a second subset of the two or more first magnets is distributed in two clusters along a center region of the first coupling surface.

* * * * *